(12) United States Patent
Wang et al.

(10) Patent No.: US 12,553,337 B1
(45) Date of Patent: Feb. 17, 2026

(54) RELATIVE GRAIN SIZE DETERMINATION AND FLOW CHARACTERIZATION IN SEDIMENTARY RESERVOIRS

(71) Applicant: Saudi Arabian Oil Company, Dhahran (SA)

(72) Inventors: Weihua Wang, Dhahran (SA); Ibrahim A. Makrami, Dhahran (SA); Abdullah K. Idrees, Dhahran (SA); Mohammed M. Alshalan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 19/185,451

(22) Filed: Apr. 22, 2025

(51) Int. Cl.
*E21B 49/00* (2006.01)
*G01V 11/00* (2006.01)

(52) U.S. Cl.
CPC .......... *E21B 49/00* (2013.01); *G01V 11/002* (2013.01); *E21B 2200/20* (2020.05)

(58) Field of Classification Search
CPC ...... E21B 49/00; E21B 2200/20; G01V 11/02
See application file for complete search history.

(56) References Cited

U.S. PATENT DOCUMENTS

| | | | |
|---|---|---|---|
| 9,939,548 B2 | 4/2018 | Burmester et al. | |
| 10,400,590 B1 * | 9/2019 | Aldred | E21B 49/00 |
| 11,047,228 B2 | 6/2021 | Zhang et al. | |
| 11,339,651 B2 | 5/2022 | Anifowose et al. | |
| 11,873,709 B2 | 1/2024 | Wang et al. | |
| 12,066,586 B2 | 8/2024 | Li et al. | |
| 12,104,476 B1 | 10/2024 | Xia et al. | |
| 2021/0270130 A1* | 9/2021 | Lu | E21B 44/00 |
| 2022/0237891 A1* | 7/2022 | Xu | G06V 10/507 |
| 2023/0304391 A1* | 9/2023 | Sheng | E21B 25/00 |
| 2024/0142662 A1* | 5/2024 | Khalifa | E21B 49/02 |

(Continued)

OTHER PUBLICATIONS

Anifowose et al., "Indirect Estimation of Clastic Reservoir Rock Grain Size from Wireline Logs Using a Supervised Nearest Neighbor Algorithm: Preliminary Results," Paper presented at the SPE Europec featured at 82nd EAGE Conference and Exhibition, Amsterdam, The Netherlands, Oct. 2021, Abstract Only, 6 pages.

(Continued)

*Primary Examiner* — Yong-Suk (Philip) Ro
(74) *Attorney, Agent, or Firm* — Fish & Richardson P.C.

(57) ABSTRACT

A relative grain size value for subterranean depth intervals is generated by executing a machine learning model to process the petrophysical well log data. The relative grain size value represents relative proportions of grain sizes of sedimentary rock materials at the un-cored depth intervals. The machine learning model is trained based on an observed grain size a petrophysical well log data of sedimentary rock materials at cored intervals. Based on the relative grain size value generated from the machine learning model, flow index values for the one or more un-cored depth intervals of the production well are determined. The flow index is a function of the effective porosity, the total clay content, and the relative grain size value. One or more target depth intervals for production of hydrocarbons are determined based at least in part on the flow index values for the un-cored depth intervals.

12 Claims, 22 Drawing Sheets

(56) References Cited

U.S. PATENT DOCUMENTS

2024/0352840 A1 10/2024 Xia et al.
2025/0297547 A1* 9/2025 Alsalmi .................. E21B 44/00

OTHER PUBLICATIONS

Kapoor et al., "Identification and estimation of grain size from wire-line logs and its effect on reservoir character—A case study in Hazad sands of Gandhar field," 11th Biennial International Conference & Exposition, 2015, 3 pages.

* cited by examiner

RELATIVE GRAIN SIZE DETERMINATION AND FLOW CHARACTERIZATION IN SEDIMENTARY RESERVOIRS

TECHNICAL FIELD

The present disclosure relates to extraction of hydrocarbons and other resources from subterranean formations. More specifically, the disclosure relates to determination of relative grain sizes and flow characteristics of such formations, and production of hydrocarbons or other fluids therefrom.

BACKGROUND

The quality of subterranean zone for hydrocarbon production that comprises a siliciclastic or other sedimentary formation can be defined by its hydrocarbon storage capacity and producibility, which can in turn reflect its porosity and permeability. Porosity and permeability can be a function of the size of the sediment grains, the clay content, and other factors. Clay content and other characteristics of subterranean zones can be determined based on petrophysical data (from, for example, wireline logs). However, grain size can be difficult to determine using conventional methods.

SUMMARY

Certain aspects of the subject matter herein can be implemented as a method for hydrocarbon production from a subterranean zone comprising sedimentary rock materials. The method includes retrieving, based on petrophysical well log data from one or more un-cored depth intervals of at least one of one or more wells drilled into the subterranean zone, an effective porosity of sedimentary rock materials at the one or more un-cored depth intervals, and retrieving, based on the petrophysical well log data from one or more un-cored depth intervals, a total clay content of the sedimentary rock materials at the one or more un-cored depth intervals. A relative grain size value for the one or more un-cored depth intervals is generated by executing a machine learning model to process the petrophysical well log data. The relative grain size value represents relative proportions of grain sizes of sedimentary rock materials at the un-cored depth intervals. The machine learning model is trained based on an observed grain size of sedimentary rock materials at one or more cored intervals of one or more wells drilled in the subterranean zone and petrophysical well log data obtained from the one or more cored intervals. Based on the relative grain size value generated from the machine learning model, flow index values for the one or more un-cored depth intervals of the production well are determined. The flow index is a function of the effective porosity, the total clay content, and the relative grain size value. One or more target depth intervals for production of hydrocarbons are determined based at least in part on the flow index values for the un-cored depth intervals. Hydrocarbons are produced from one or more target depth intervals.

DETAILED DESCRIPTION

Figure 1:
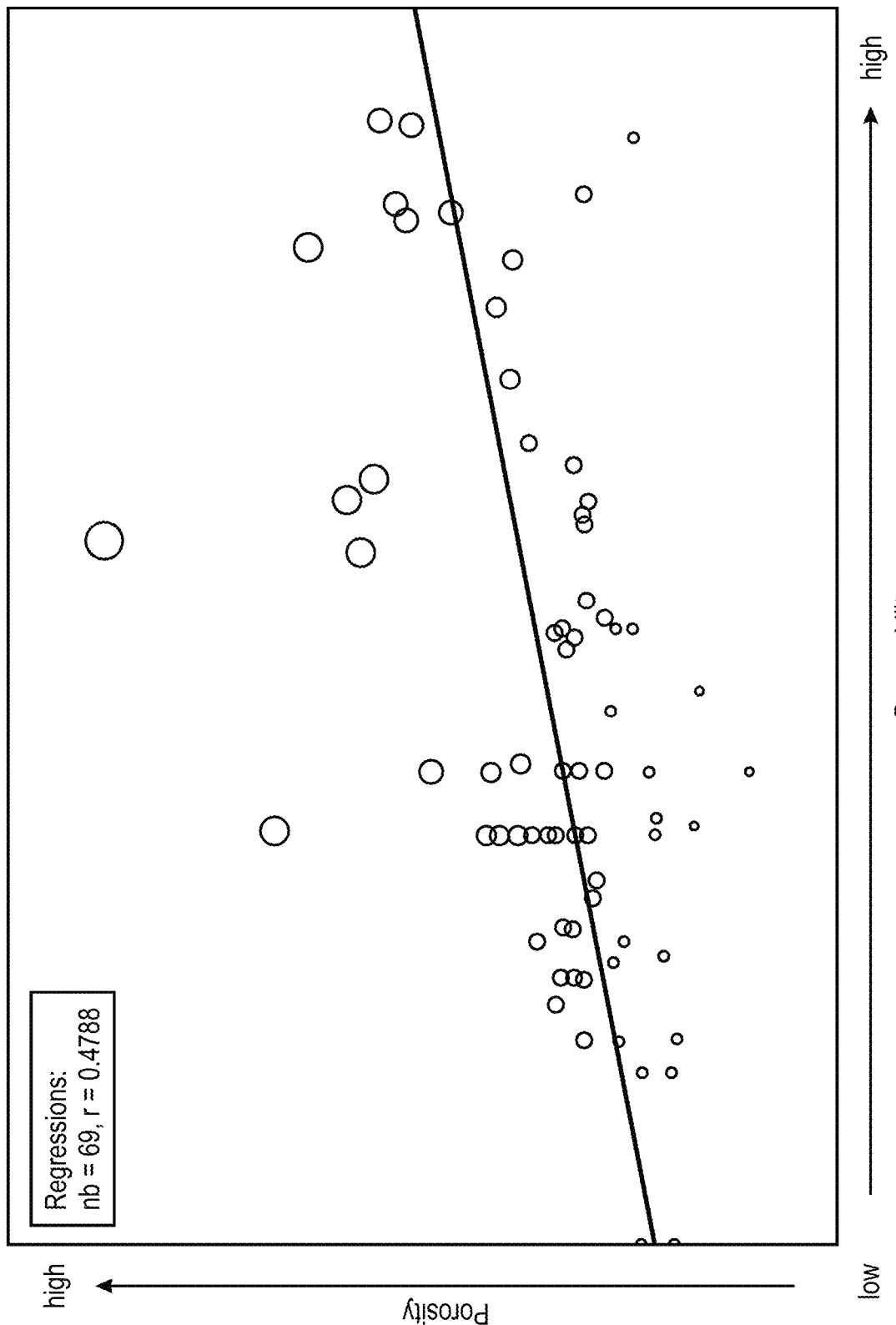
FIG. 1 is an example chart of relative permeability versus relative porosity of core samples from a typical sandstone reservoir, in accordance with embodiments of the present disclosure.
Figure 2:
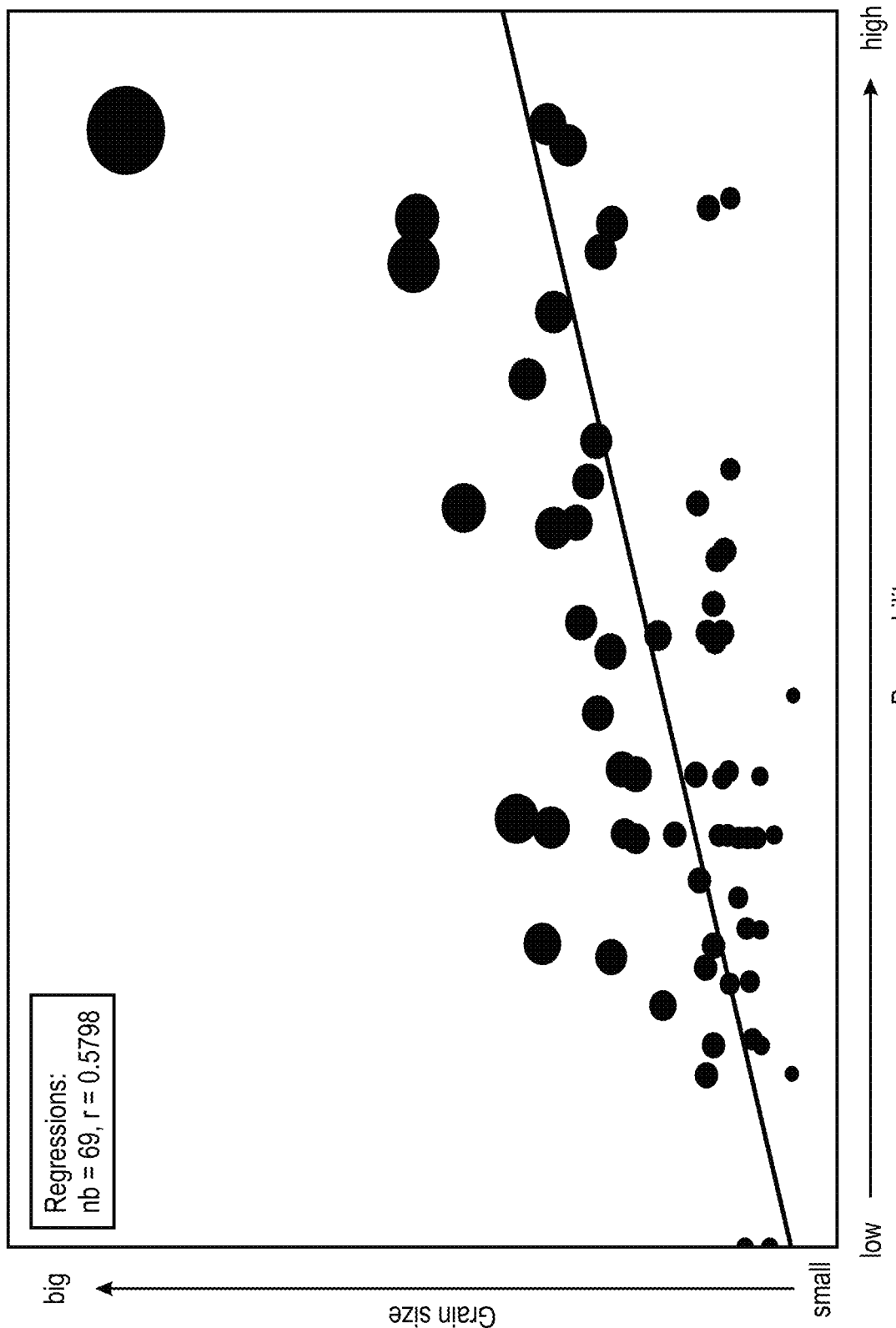
FIG. 2 is an example chart of relative permeability versus grain size of core samples from a typical sandstone reservoir, in accordance with embodiments of the present disclosure.
Figure 3:
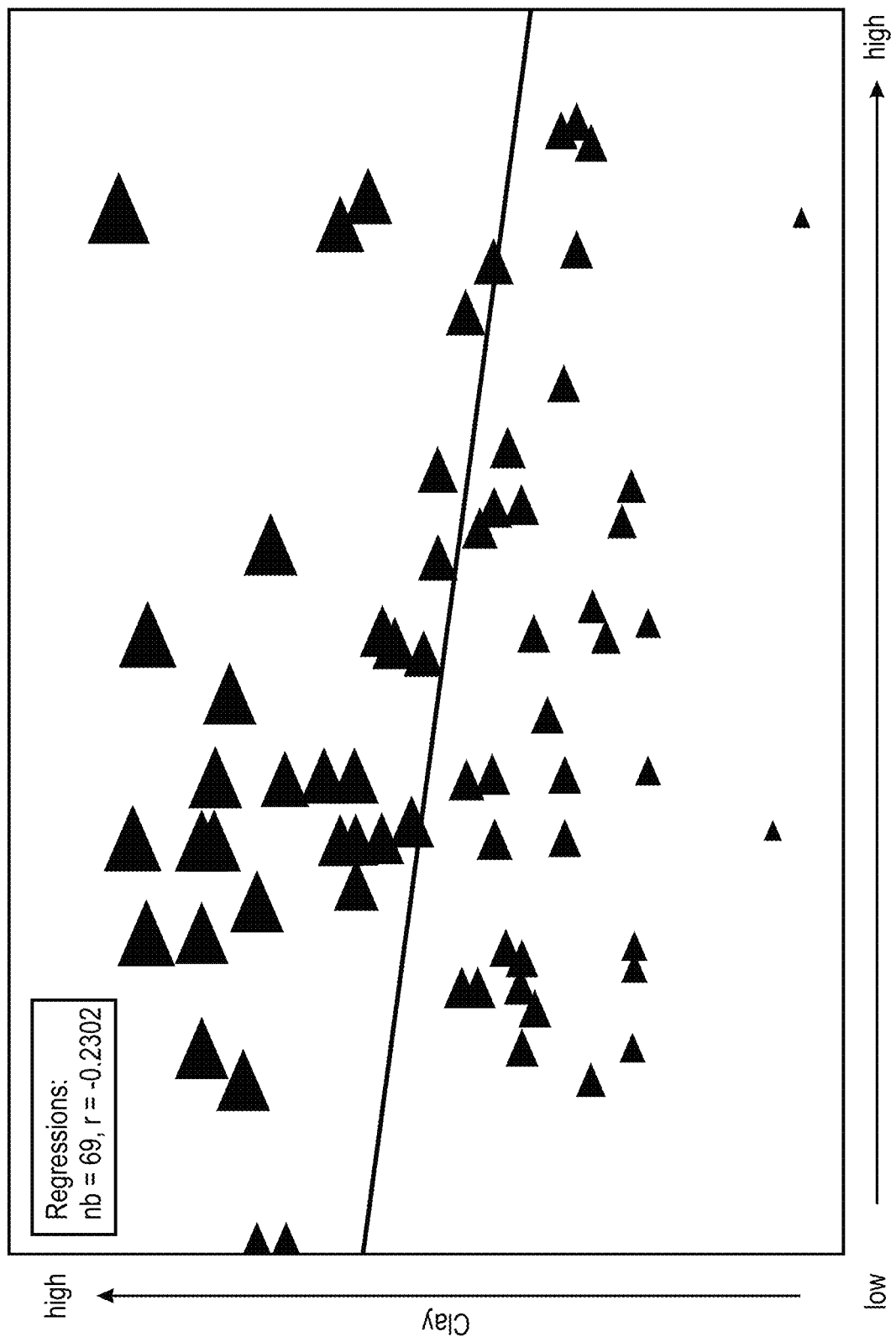
FIG. 3 is an example chart of relative permeability versus clay content of core samples from a typical sandstone reservoir, in accordance with embodiments of the present disclosure.
Figure 4A:
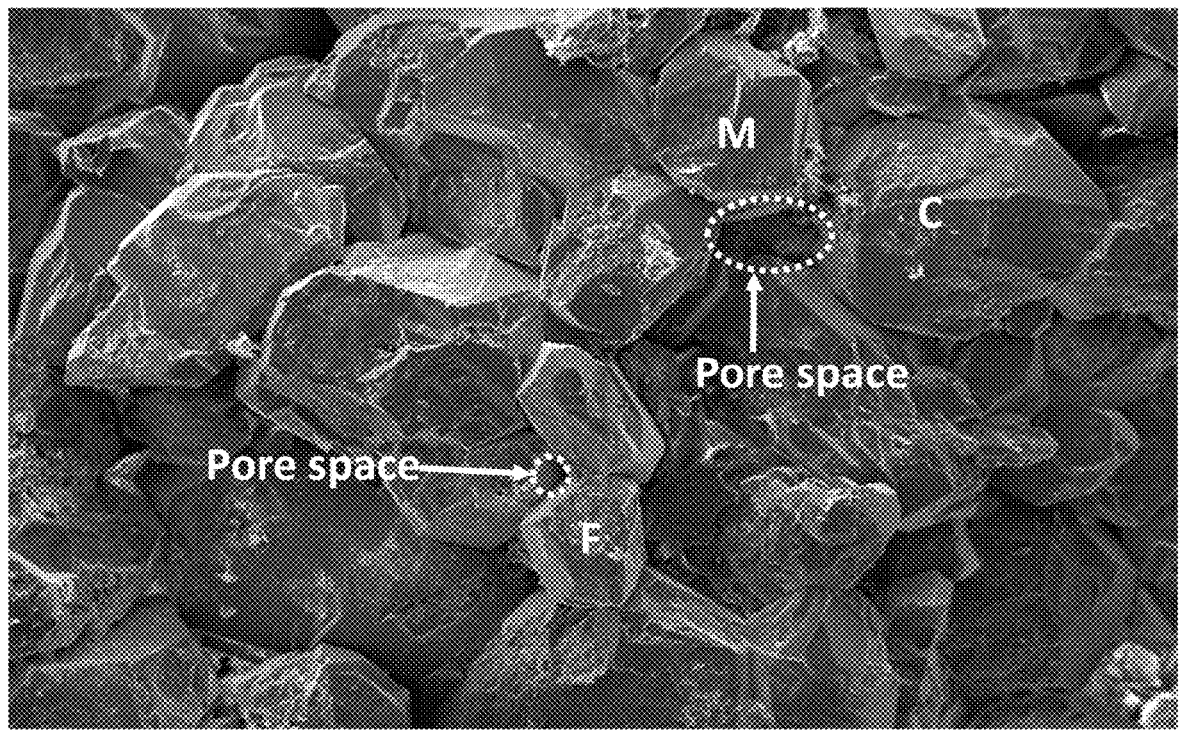
FIGS. 4A and 4B are scanning electron microscopy (SEM) micrographs of rock materials from a sedimentary reservoir.
Figure 4B:
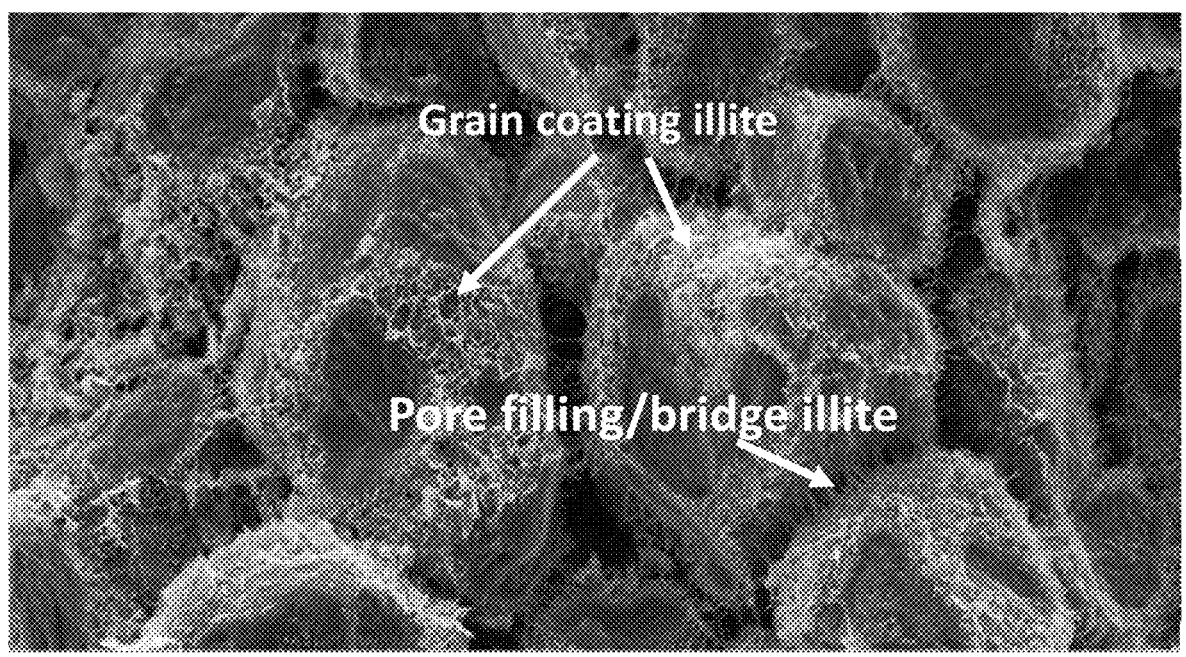
Figure 5A:
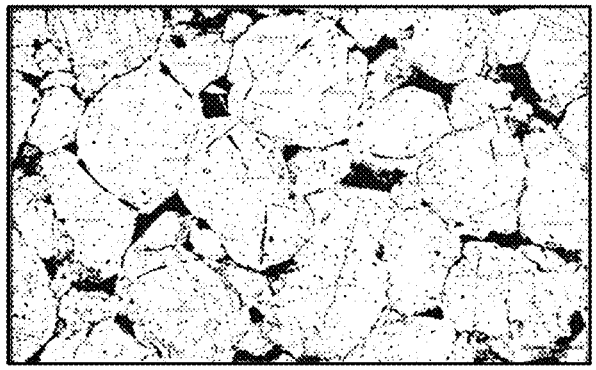
FIGS. 5A-5D are thin-section petrographs of sandstones of different grain sizes, in accordance with embodiments of the present disclosure.
Figure 5B:
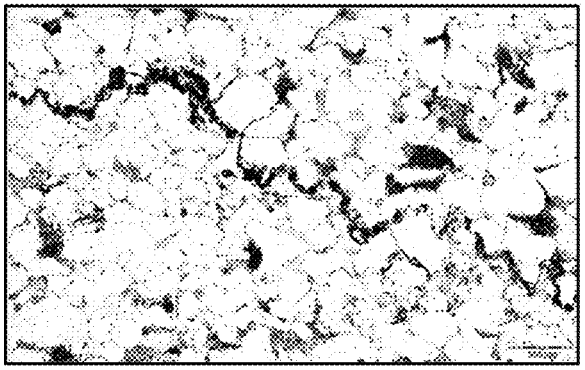
Figure 5C:
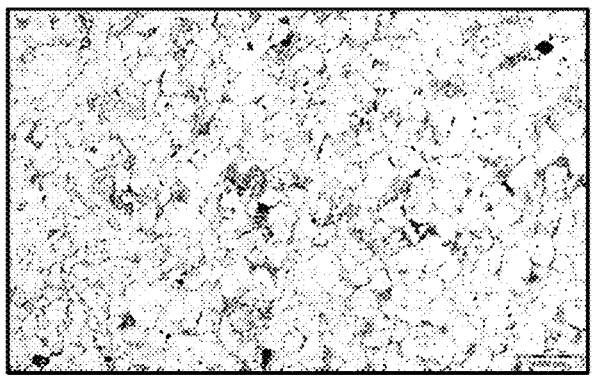
Figure 5D:
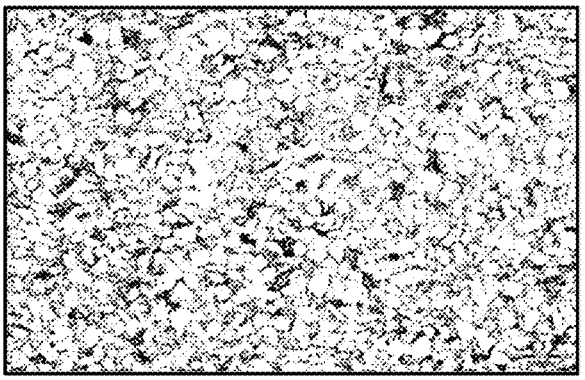

The quality of a sandstone reservoir can be defined by its hydrocarbon storage capacity and producibility which can be reflected by its porosity and permeability. FIG. 1 is an example chart of relative permeability versus relative porosity of core samples from a typical sandstone reservoir. As can be seen from FIG. 1, there is a correlation between higher porosity and higher permeability in such a reservoir. However, as shown in FIGS. 2 and 3 (which are example charts of relative permeability versus grain size of core samples and of relative permeability versus clay content, respectively, from such a sandstone reservoir) permeability is heavily affected by grain size and clay content. In particular, authigenic clay, such as authigenic illite can negatively affect reservoir permeability. FIGS. 4A and 4B are scanning electron microscopy (SEM) micrographs of rock materials from a sedimentary reservoir. A rock material with a relatively large grain size, as shown in FIG. 4A, corresponds to a larger pore size and higher permeability as compared to an otherwise similar rock material with a smaller grain size, as shown in FIG. 4B.

Table 1 provides correlation coefficients between permeability and porosity, between permeability and grain size, and between permeability and clay content, for a typical sandstone reservoir:

TABLE 1

|  | Porosity | Grain Size | Clay Content |
|---|---|---|---|
| Coefficient of correlation with permeability | 0.4788 | 0.5798 | −0.2302 |

As can be seen from Table 1, grain size has a higher correlation coefficient values against permeability than porosity and clay content.

Porosity, permeability and clay content can readily be obtained through wireline petrophysical evaluation and core data integration. However, it can be difficult or impossible to obtain grain size distribution from logging data as no logging tool can measure the grain size directly. While nuclear magnetic resonance (NMR) logging can provide pore size distribution which may indirectly reflect the grain size change, NMR logging can be limited by its relatively high expense and complexity. Some previous study shown that wireline logs can provide indirect estimation of clastic reservoir rock grain size through different means. For example, see Deepak Kapoor and Sarvesh Mallik (2015) "Identification and Estimation of Grain Size from Wire-line logs and its Effect on Reservoir character—A case study" in Hazad sands of Gandhar field. 11th Biennial International Conference & Exposition; Fatai Adesina Anifowose, Mokhles Mustafa Mezghani, and Saeed Saad Shahrani (2021), "Indirect Estimation of Clastic Reservoir Rock Grain Size from Wireline Logs Using a Supervised Nearest Neighbor Algorithm: Preliminary Results"; Society of Petroleum Engineers. However, grain size can be most readily determined through analysis of core samples (by, for example, visual inspection, sieve analysis, thin section analysis, thin section image analysis, or laser diffraction of core sample). For example, FIGS. 5A-5D shows thin-section petrographs of sandstones of different grain sizes, including coarse-grained sandstone (A), medium-grained sandstone, (B), fine-grained sandstone (C), and siltstone (D). However, coring and core plug sampling is costly and typically limited to a small number of wells in any given reservoir or field. Coring intervals may also be limited and may not cover the entire stratigraphic interval of interest.

In accordance with embodiments of the present disclosure, a machine learning model is trained based on relative grain size (RGS) values observed in core samples taken from well intervals ("cored training intervals") and petrophysical well log data corresponding to those cored training intervals. The observations of grain sizes can be by visual inspection, sieve analysis, thin section analysis, thin section image analysis, or other suitable observational methods. In some embodiments, the RGS values reflects relative proportions of a pre-defined set of grain-size percentages. For example, in some embodiments, the RGS value of a sample reflects the percentage of course-grained sands, the percentage of medium-grained sands, the percentage of fine-grained sands, the percentage of siltstone, and the percentage of shale. In such embodiments, the RGS value calculated with the following equation (1):

$$RGS=(CSA*5)+(MSA*4)+(FSA*3)+(SS*2)+(SH*1) \quad \text{(Equation 1)}$$

wherein CSA is the percentage of course-grained sands, MSA is the percentage of medium-grained sands, FSA is the percentage of fine-grained sands, SS is the percentage of siltstone, and SH is the percentage of shale. The RGS value from equation (1) will be a value between 1 and 5.

With the model trained, it can then be executed to process petrophysical well data from un-cored intervals (for example, in other existing or new wells) to generate RGS values for those un-cored wells and intervals. A flow index (FI) for those un-cored wells and intervals can be calculated that reflects the RGS, effective porosity and clay content of the interval. A higher FI value for a depth interval will reflects a higher producibility of hydrocarbons or other fluids from that interval. In some embodiments, an FI can be calculated using the following equation (2):

$$FI = \frac{PHIE}{(a + \text{total clay})} * \frac{RGS}{5} \quad \text{(Equation 2)}$$

wherein PHIE is the effective porosity, total clay is the total clay content, a is a constant value, and RGS is the relative grain size value. PHIE can be calculated by subtracting the bound water volume (VBW) from the total porosity (PHIT). Total porosity (PHIT) can be calculated by using the density log (RHOB) and neutron porosity log (TNPL). Total clay is the lump sum of chlorite, kaolinite and illite which can be derived through wireline logs, such as, Gamma Ray log (GR) and Spectral Gamma Ray log (SGR) log analysis and interpretation. Based on the FI values for depth intervals in a well, one or more target intervals for hydrocarbon production can be identified, and hydrocarbons produced from those identified target interval(s).

Figure 6:
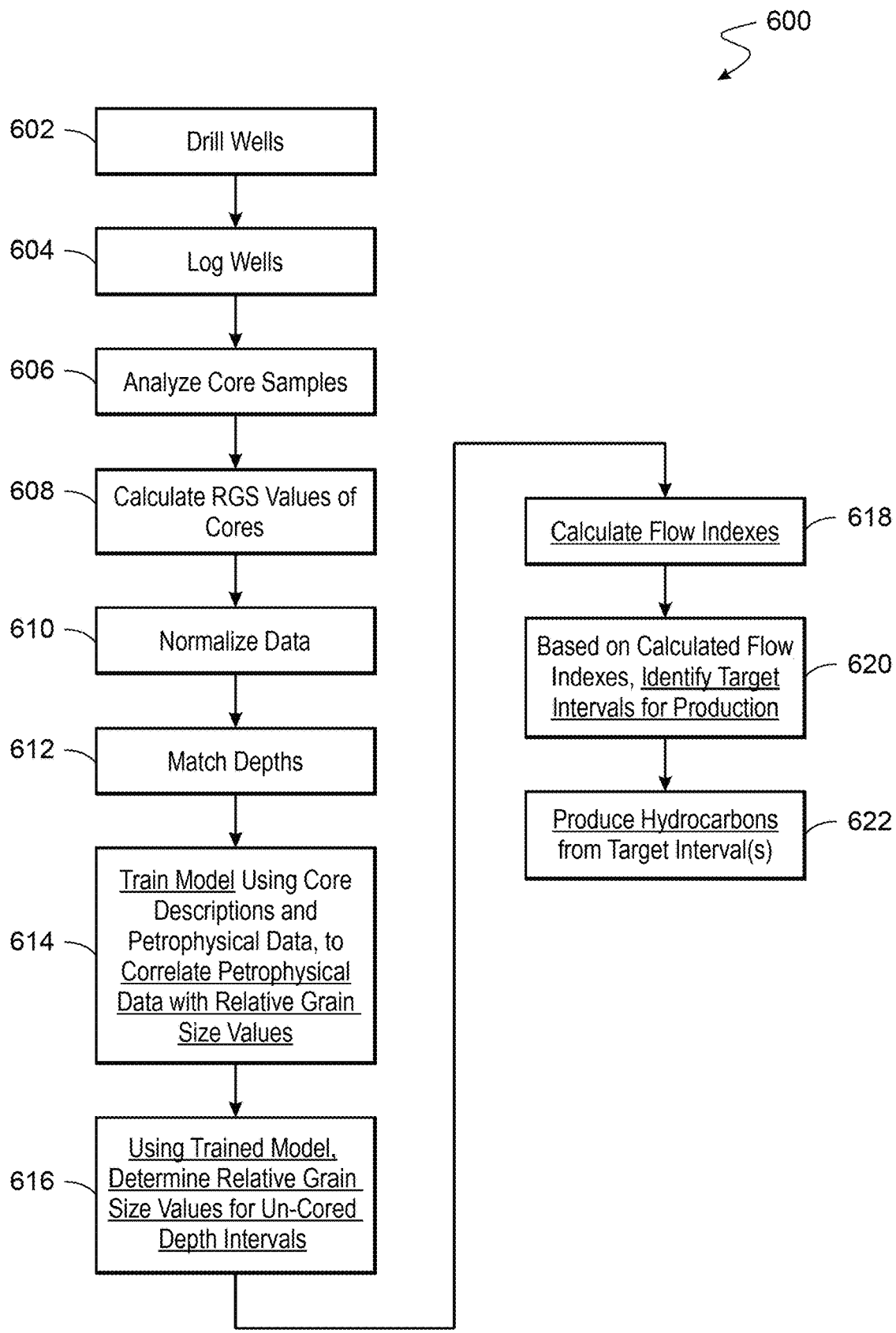
FIG. 6 is a process flow diagram of a method for hydrocarbon production in accordance with embodiments of the present disclosure, in accordance with embodiments of the present disclosure.
Figure 15:
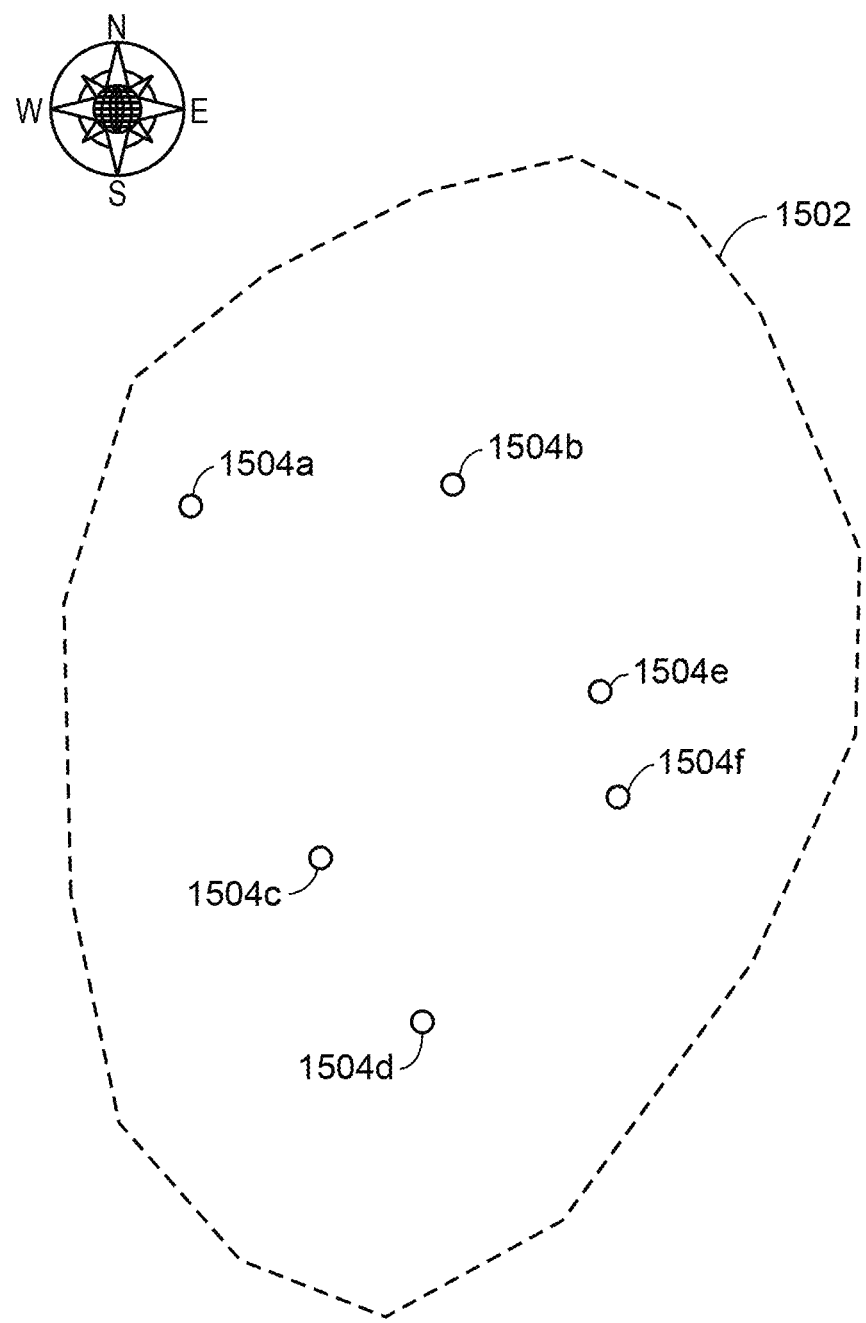
FIG. 15 is an overhead plan view of a subterranean zone within which wells have been drilled, in accordance with embodiments of the present disclosure.
Figure 16:
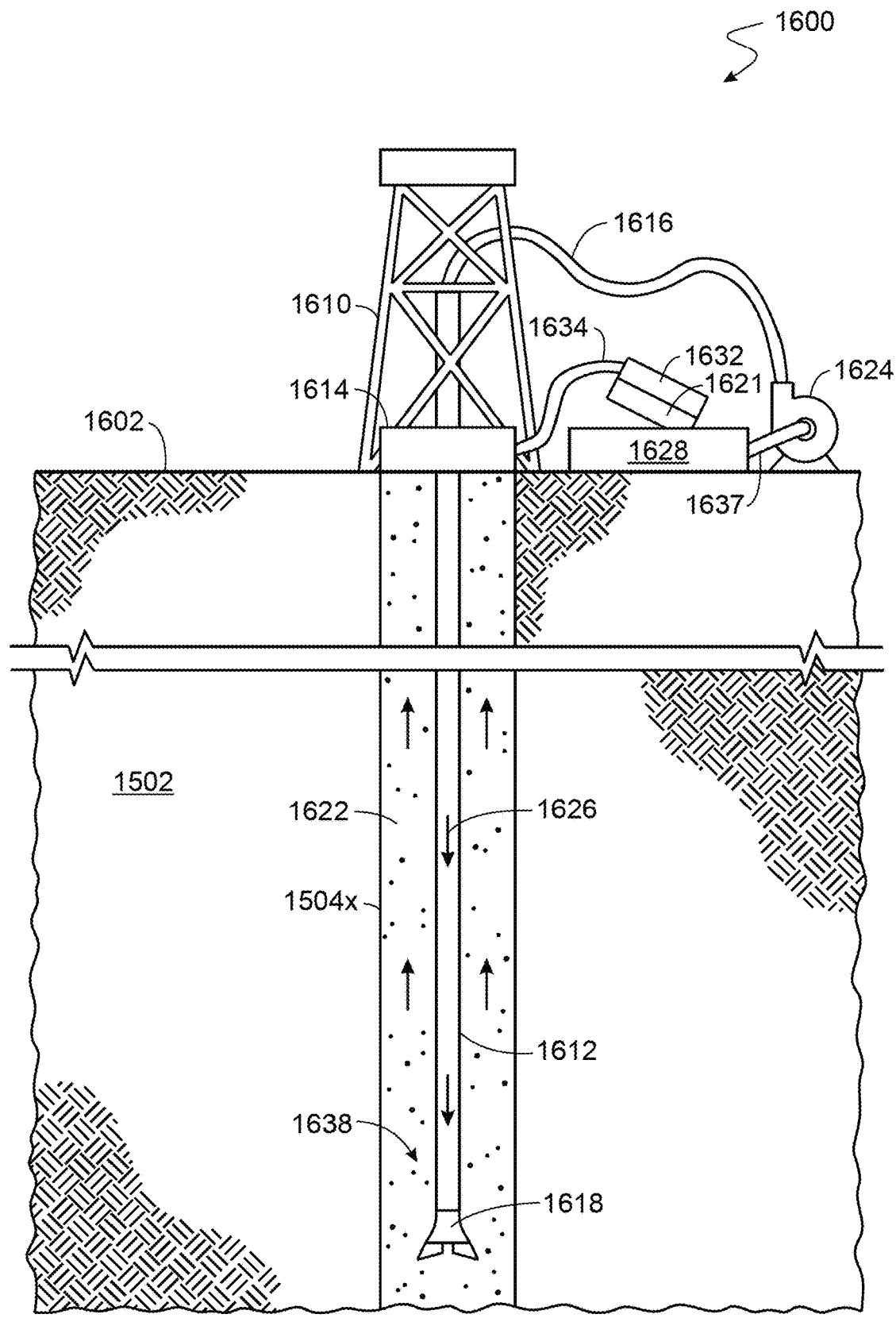
FIG. 16 is a schematic illustration of a well drilling system in accordance with embodiments of the present disclosure.

FIG. 6 is a process flow diagram of a method for hydrocarbon production in accordance with embodiments of the present disclosure. The method begins at step 602 in which one or more wells are drilled into a subterranean zone (such as a sandstone reservoir) which can be, for example, subterranean zone 1502 of FIG. 15. The one or more wells can be, for example, one or more of wells 1504a-1504f of FIG. 15. Drilling of wells can be by, for example, drilling system 1600 of FIG. 16. Proceeding to step 604, selected wells and intervals are cored and, at step 606, the wells are logged with petrophysical logging tools. Such logging can be by, for example, logging system 1700 of FIG. 17. Logging data can include, for example, gamma ray (GR), bulk density (RHOB), thermal neutron porosity (TNPL), NMR, deep laterolog (LLD), shallow laterolog (LLS), and other suitable well data. At step 608, analysis of cored intervals is conducted to provide detailed lithological and grain size descriptions of the samples. Such analysis can be by, for example, visual inspection, sieve analysis, thin section analysis, or thin section image analysis of the cores. It will be understood that, in some embodiments, one or more pre-existing wells, pre-existing well logs, and pre-existing core descriptions of training intervals are available and can be retrieved such that drilling and logging of new wells may not be necessary.

Figure 7A:
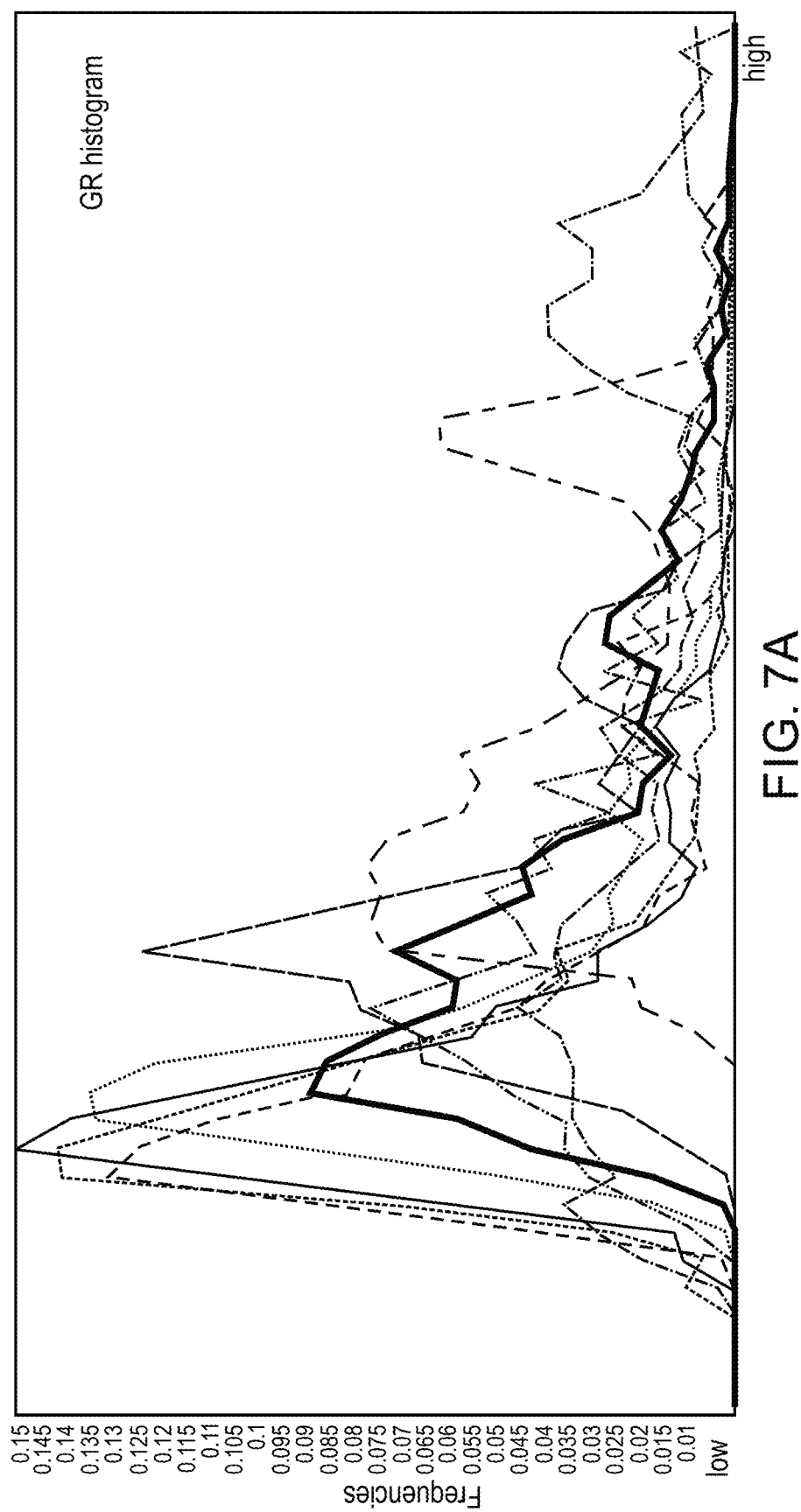
FIGS. 7A-7B are gamma ray (GR) log histograms of a plurality of wells before and after normalization, in accordance with embodiments of the present disclosure.
Figure 7B:
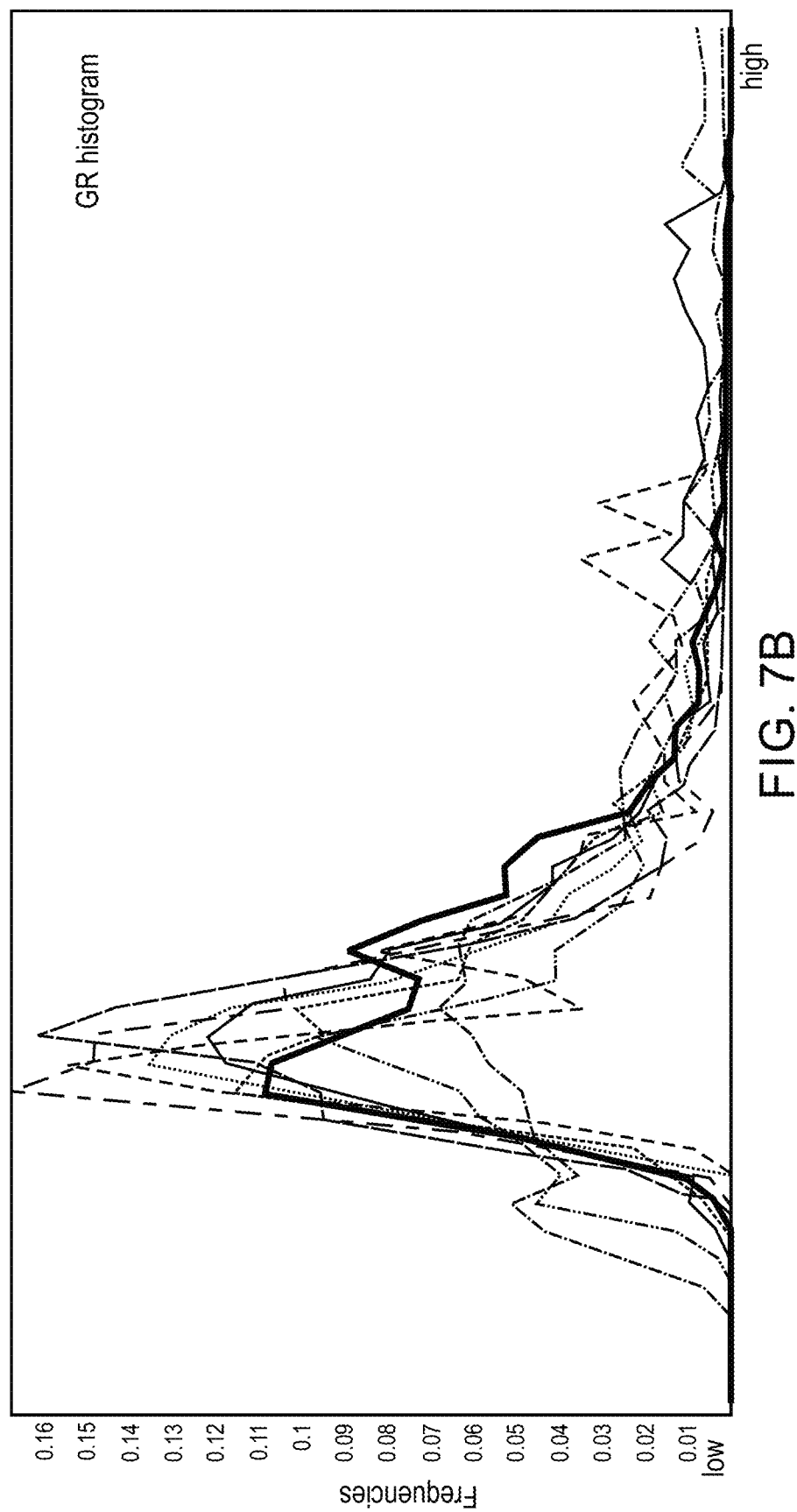
Figure 8A:
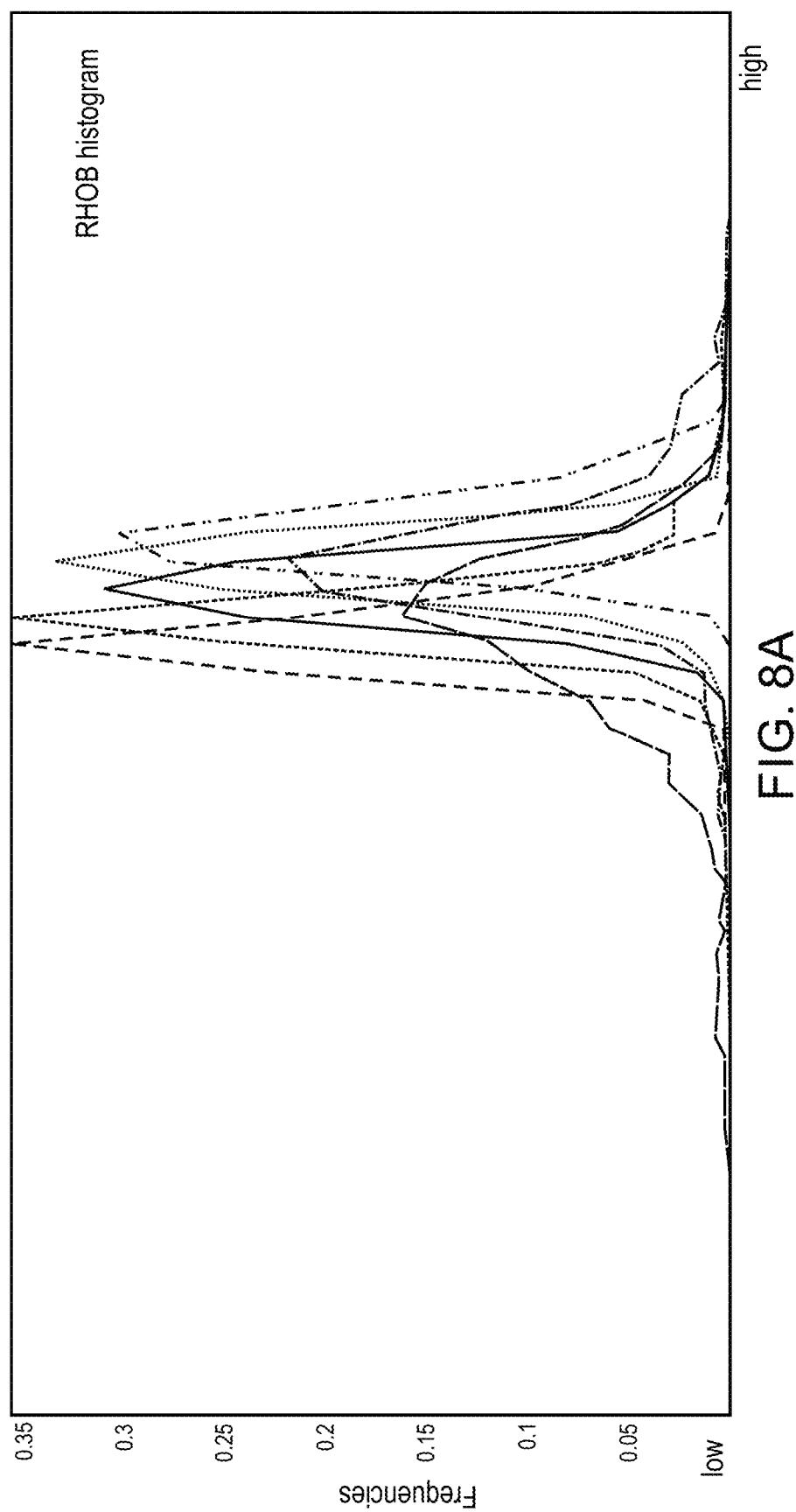
FIGS. 8A-8B are density (RHOB) log histograms of a plurality of wells before and after normalization, in accordance with embodiments of the present disclosure.
Figure 8B:
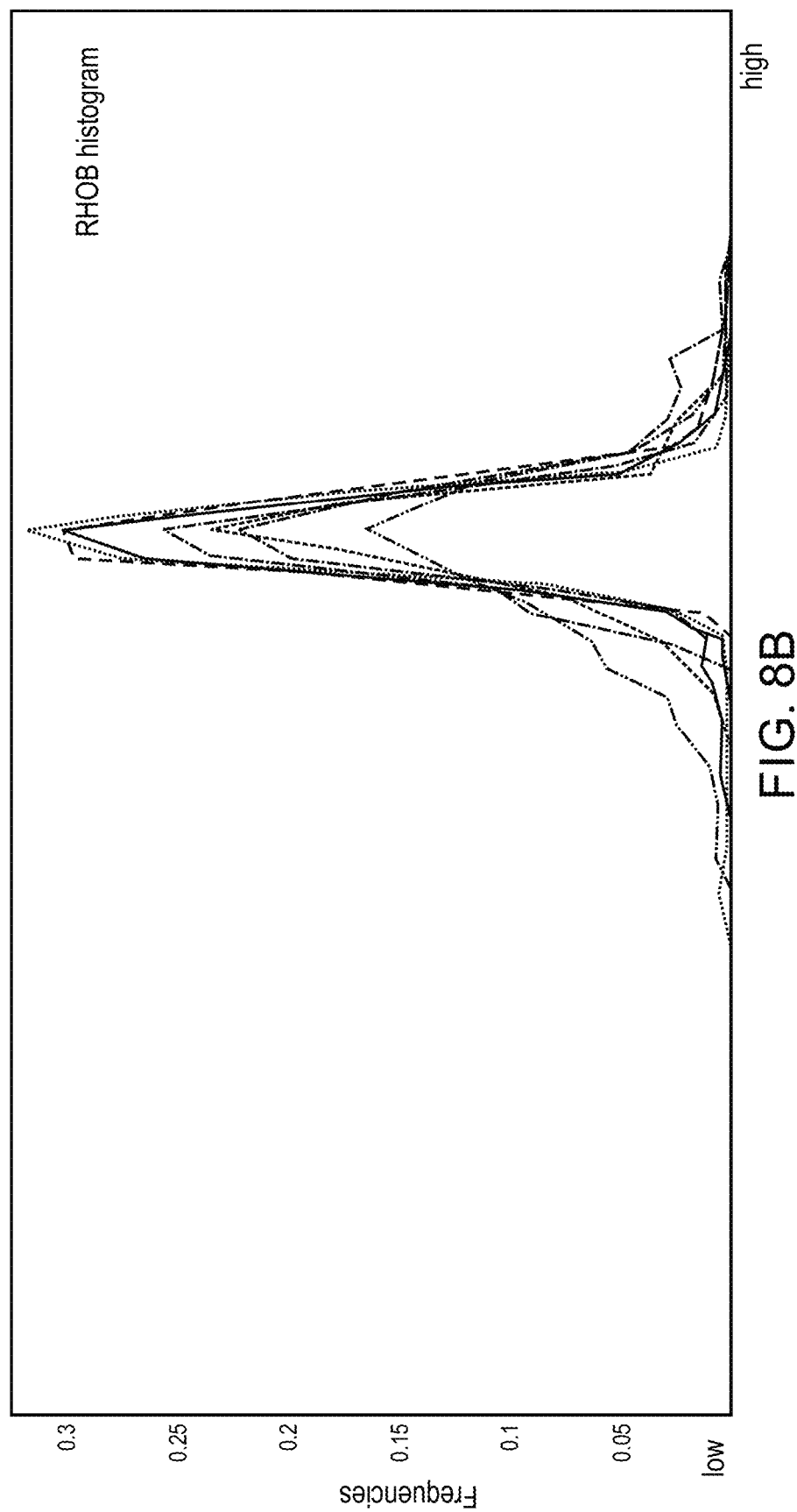
Figure 9A:
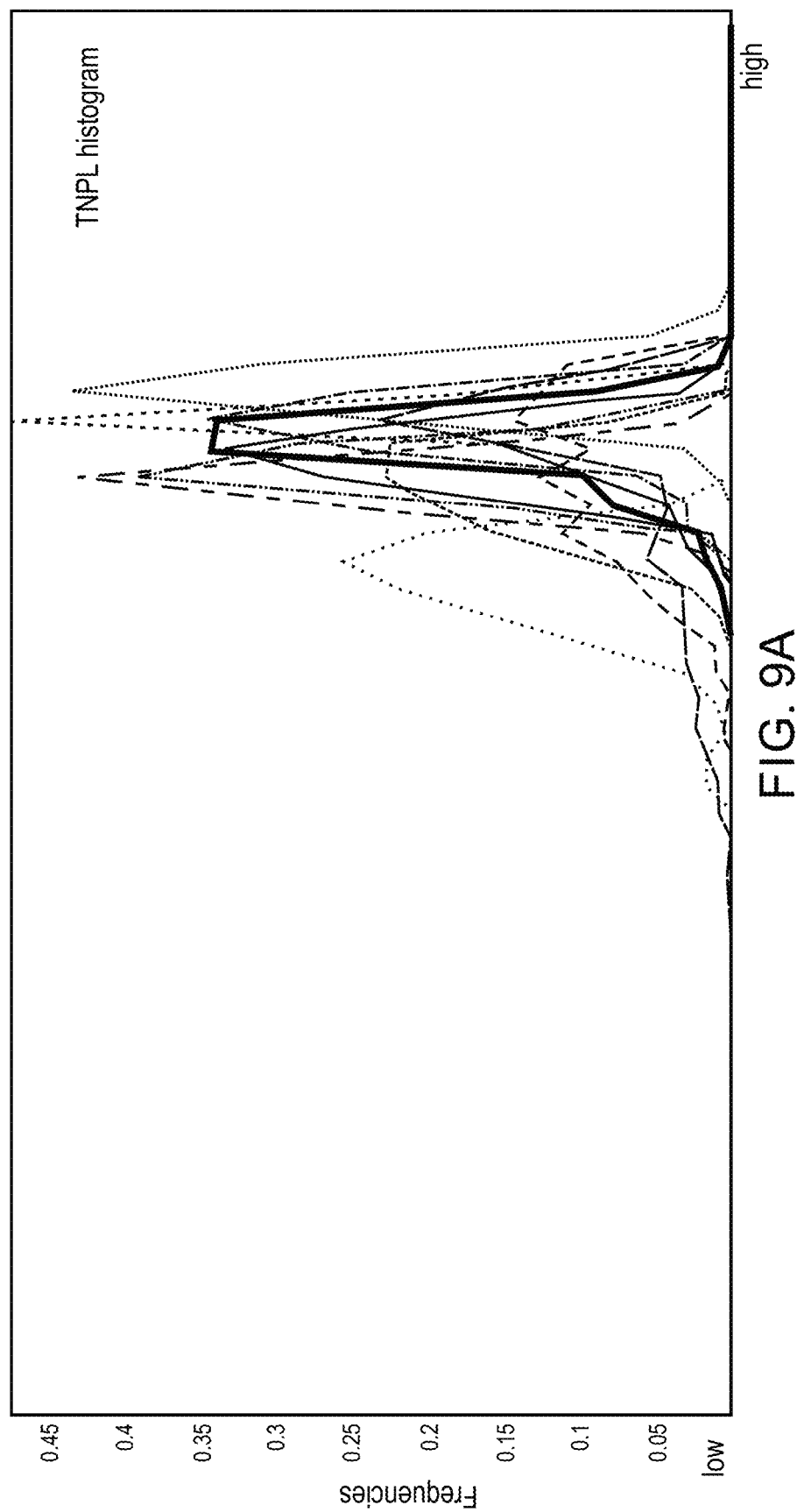
FIGS. 9A-9B are thermal neutron porosity (TNPL) log histograms of a plurality of wells before and after normalization, in accordance with embodiments of the present disclosure.
Figure 9B:
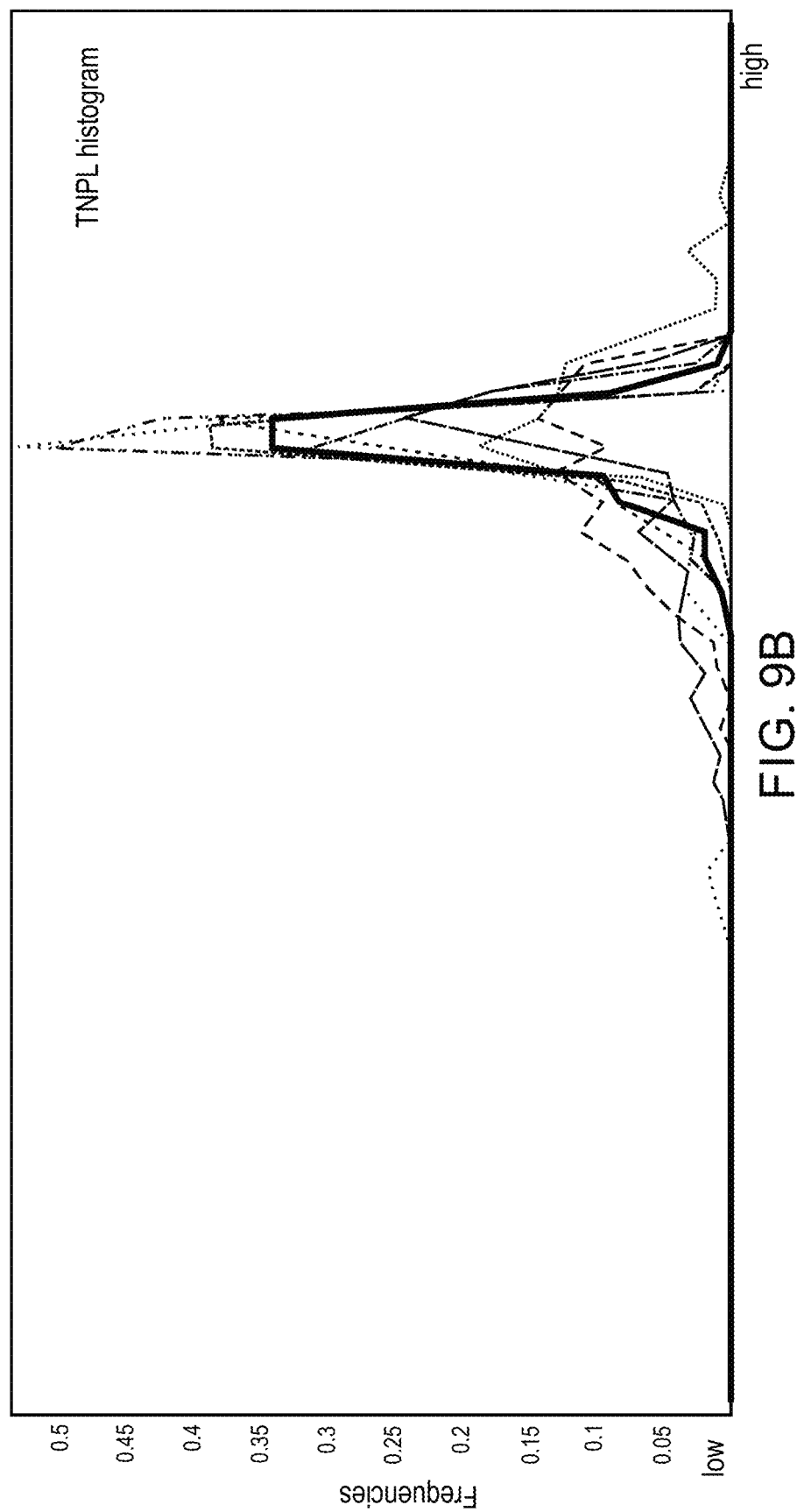

Proceeding to step 610, the logging data for multiple wells are normalized. Normalization generally compensates the log measurements that may vary due to one or more variables in conditions such as (for example) inaccurate tool calibration, drift in the measuring devices, differences in tool response resulting from differences in vendors, tool types, differences in rock and fluid properties. The same reservoir in the same field should have similar log response in terms of those log's distribution range and pick value distribution. FIGS. 7A-7B are gamma ray log histograms before and after normalization, in accordance with embodiments of the present disclosure. In FIGS. 7A and 7B, the horizontal axis represents gamma ray values (in American Petroleum Institute gamma ray units (gAPI)) from low to high and the vertical axis indicates frequency. FIGS. 8A-8B are density (RHOB) log histograms before and after normalization, in accordance with embodiments of the present disclosure. In FIGS. 8A and 8B, the horizontal axis represents RHOB values from low to high and the vertical axis indicates frequency. FIGS. 9A-9B are thermal neutron porosity (TNPL) log histograms before and after normalization, in accordance with embodiments of the present disclosure. In FIGS. 9A and 9B, the horizontal axis represents TNPL values from low to high and the vertical axis indicates frequency.

Figure 10:
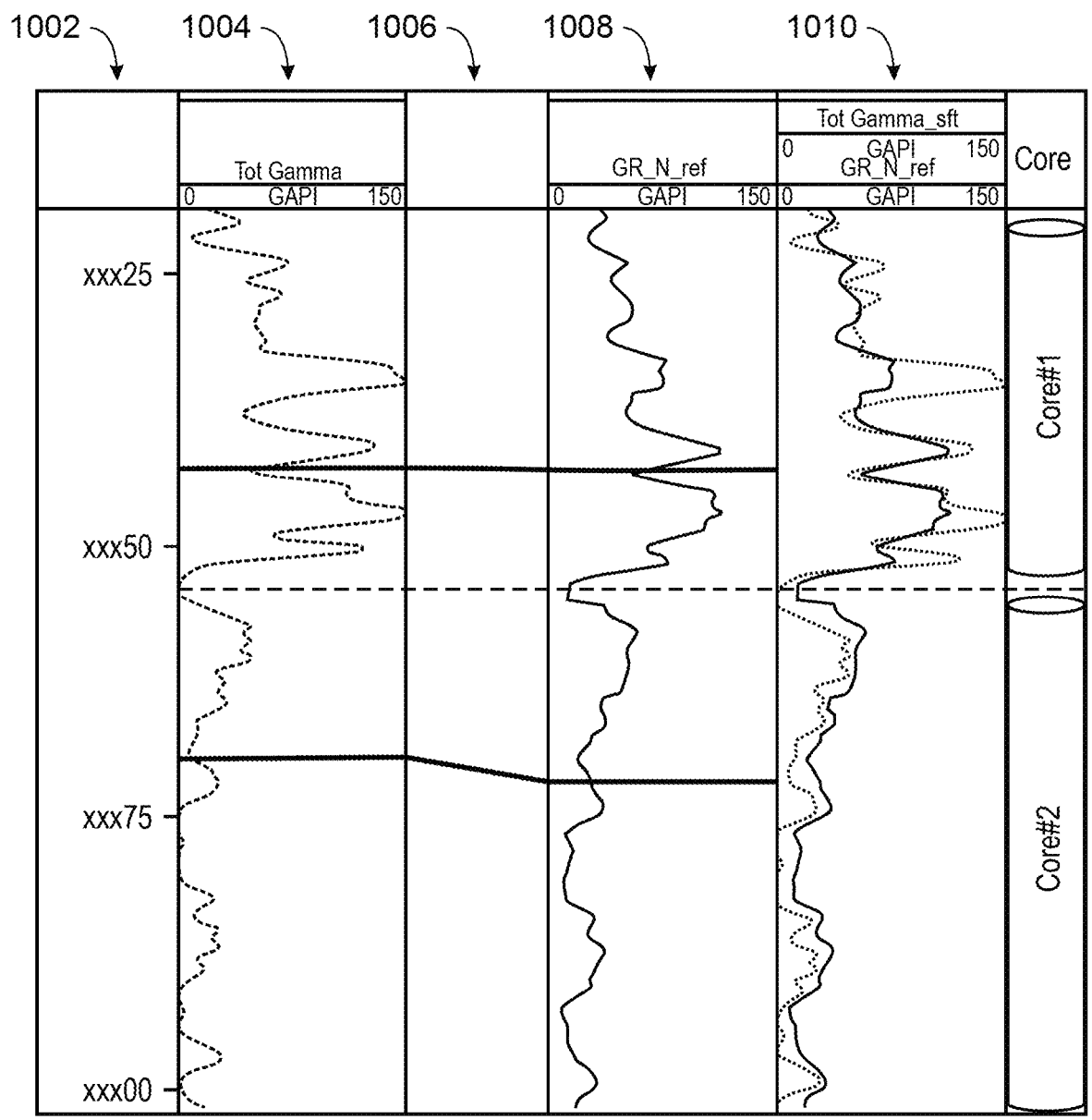
FIG. 10 is an example of core gamma ray and open hole log gamma ray depth matches, in accordance with embodiments of the present disclosure.

Proceeding to step 612, depths of cores and logging data are analyzed and adjusted so as to ensure the depths match or substantially match. This step is usually achieved by matching the recorded core GR data for each core boxes with the open hole log GR measurement. FIG. 10 is an example of core gamma ray (Tot gamma) and open hole log gamma ray (GR_N_ref) depth matches, in accordance with embodiments of the present disclosure. Block depths of different cores may need to be shifted to address gaps between cores. FIG. 10 is an illustrative example of depth adjustment for well log and core data in a well drilled into a sedimentary reservoir. In FIG. 10, column 1002 is the measured depth, column 1004 is the total gamma ray (GR) measured from core samples (core GR), column 1006 shows the depth difference between core GR and gamma ray measurements from well log data (log GR, as shown in column 1008) and column 1010 shows the depth matched core GR and log GR.

Proceeding to step 614, a machine learning model is trained based on core description and well log integration of cored training intervals. More specifically, the model is trained using (a) well logs and (b) relative grain size core analysis from cored intervals so that the model can to recognize relative grain size, from well log data, in intervals that are not cored (i.e., for intervals which only log data is available). The machine learning model can be, for example, semi-supervised hierarchical clustering machine learning model or another suitable model.

Figure 11:
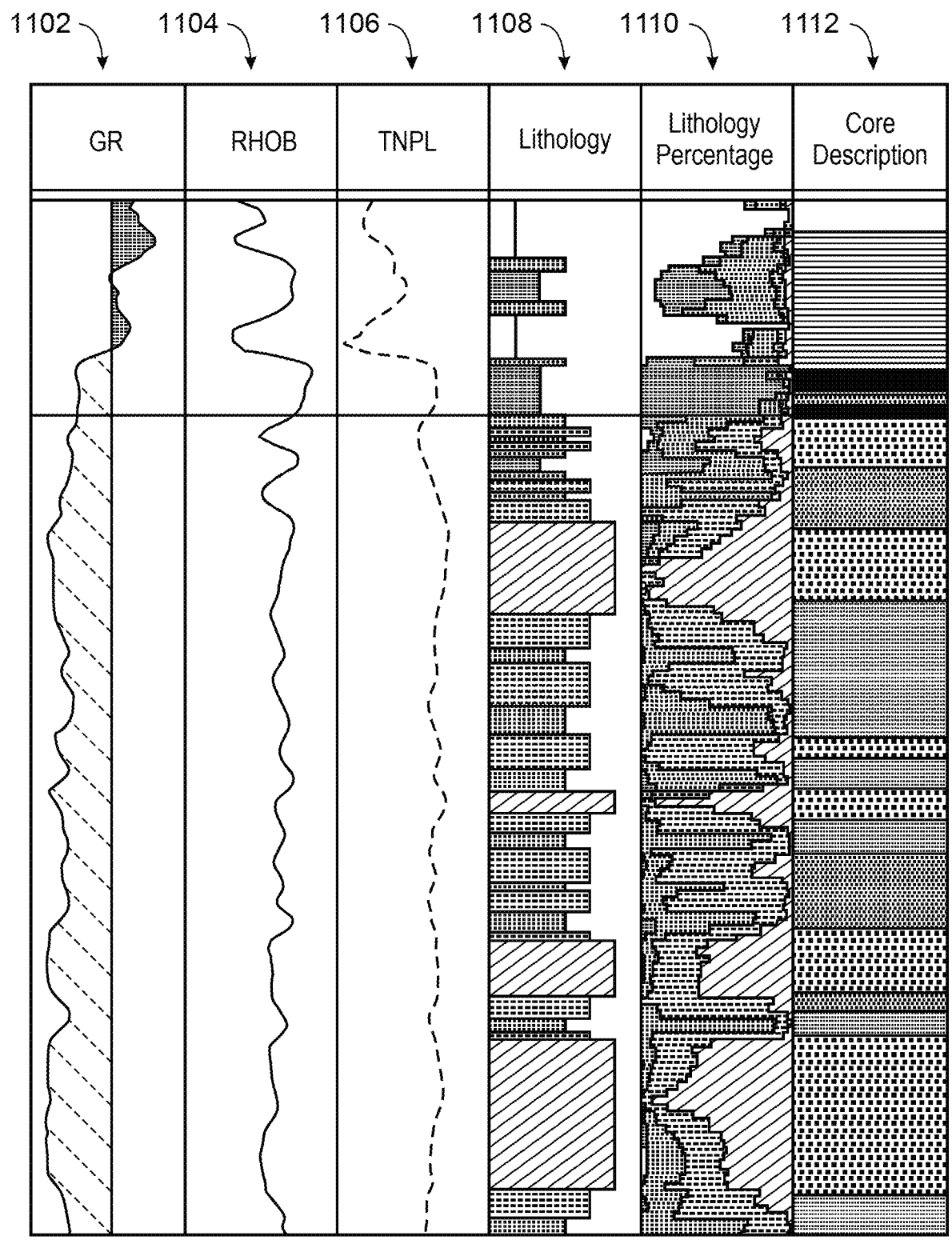
FIG. 11 is composite plot showing open hole log and core description integration for lithology prediction, in accordance with embodiments of the present disclosure.

Proceeding to step 616, the trained model is applied to logging data from un-cored depth intervals, to derive lithology in terms relative proportions of a pre-defined set of grain-size percentages. For example, in some embodiments, as described above, lithology can be determined and expressed as percentage of course-grained sands, the percentage of medium-grained sands, the percentage of fine-grained sands, the percentage of siltstone, and the percentage of shale. FIG. 11 is composite plot showing open hole log and core description integration for lithology prediction, in accordance with embodiments of the present disclosure. The model can be validated using, for example, NMR logs over the training intervals. RGS values are determined for un-cored depth intervals of potential production interest using, for example, equation (1).

Figure 12:
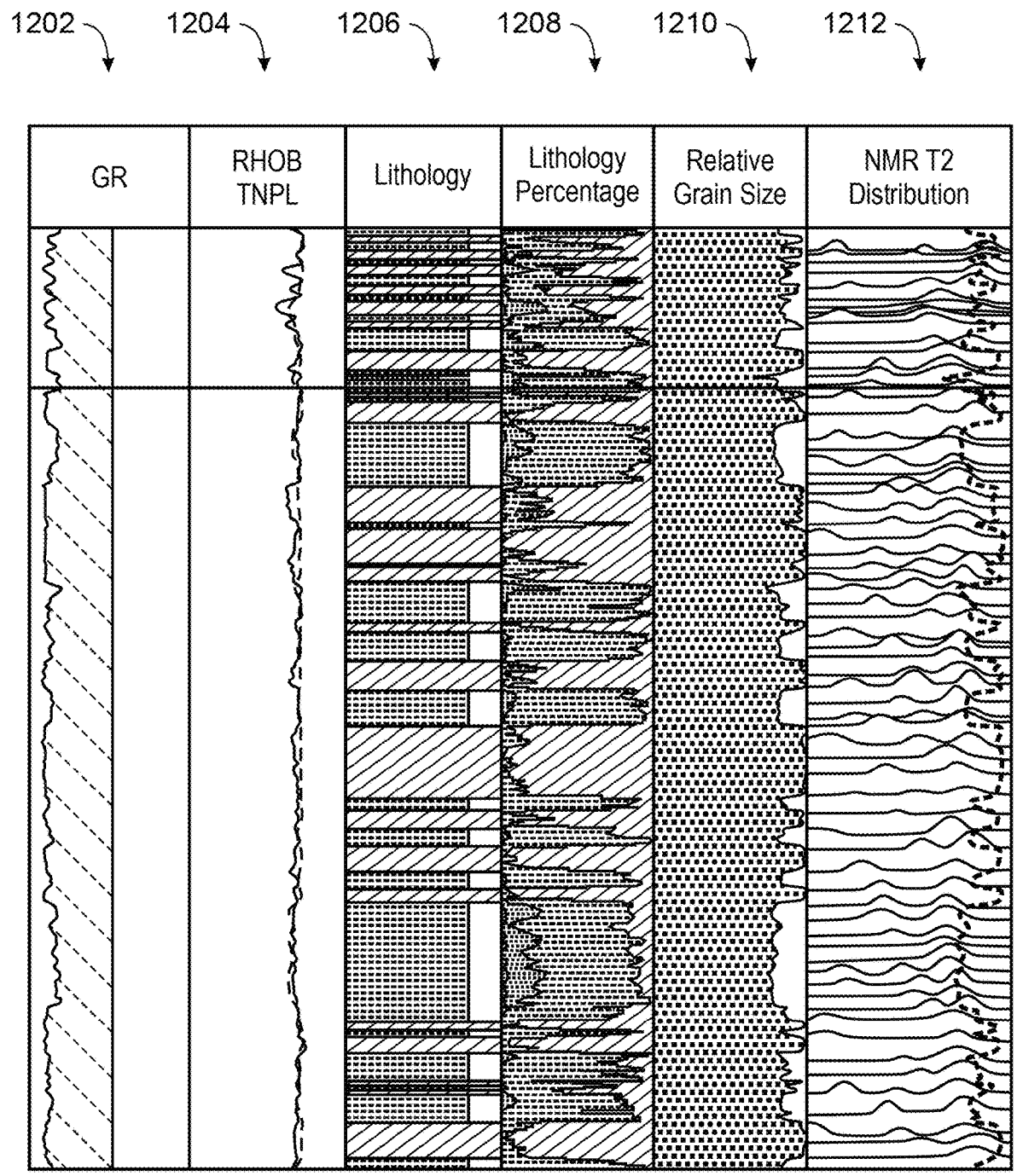
FIG. 12 is composite plot showing predicted lithology and estimated relative grain size against measured nuclear magnetic resonance (NMR T2) distribution, in accordance with embodiments of the present disclosure.
Figure 13:
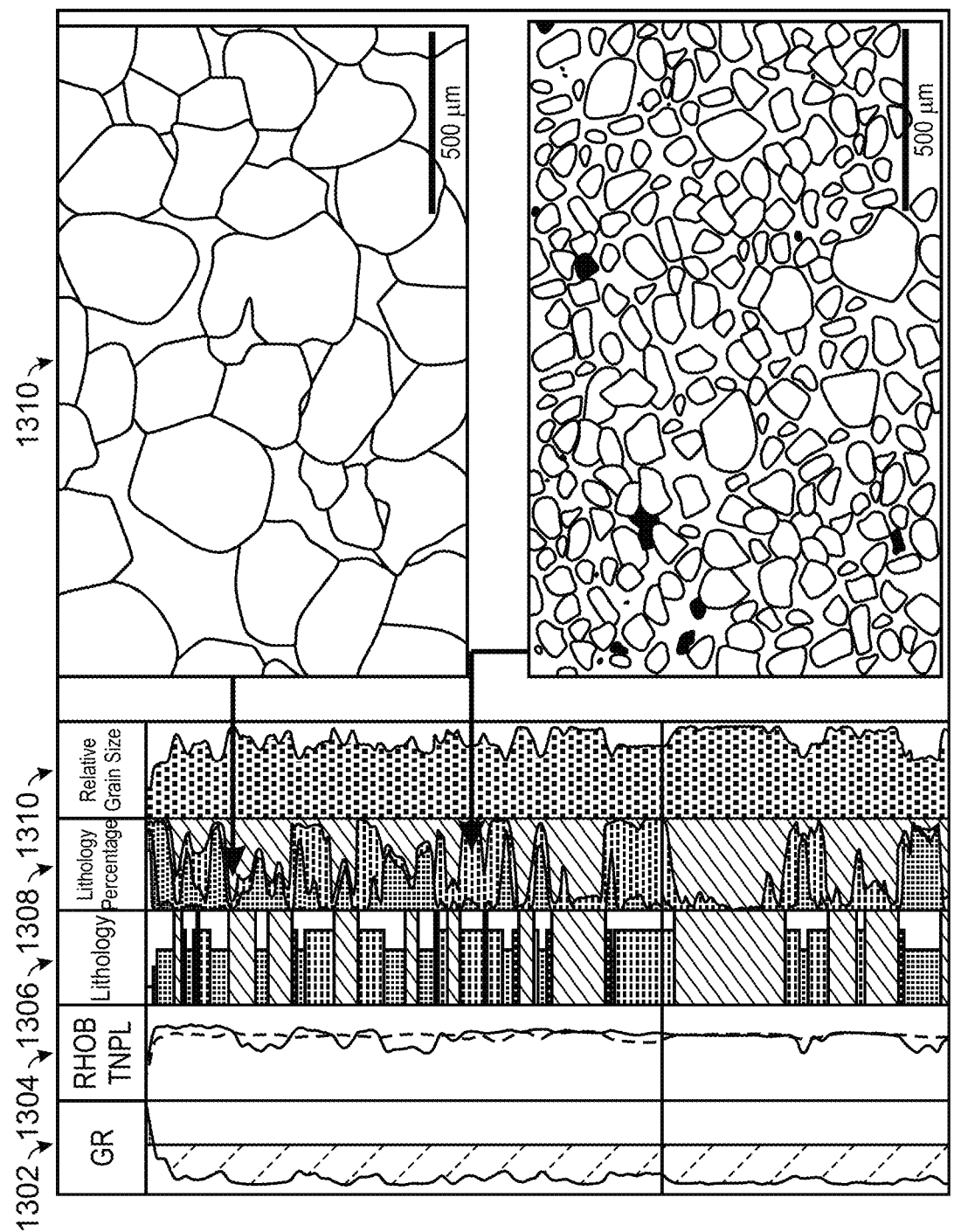
FIG. 13 is a composite plot showing predicted lithology, percentage for each lithology and estimated relative grain size and thin section petrography, in accordance with embodiments of the present disclosure.

FIGS. 11, 12, and 13 illustrate training and validation of the model in accordance with embodiments of the present disclosure. In FIG. 11, column 1102 is the log GR, column 1104 is the RHOB log, column 1106 is the TNPL log, column 1108 is the predicted lithology, column 1110 is the predicted lithology in percentages (from application of the model), and column 1112 is the core description lithology. The objective of this process is to have the best possible lithology prediction which agrees with available core description. FIG. 12 is composite plot showing predicted lithology and estimated relative grain size against measured nuclear magnetic resonance (NMR T2) distribution, in accordance with embodiments of the present disclosure. In FIG. 12, column 1202 is the log GR, column 1204 is the RHOB log, column 1206 is the predicted lithology, column 1208 is the predicted lithology in percentages (from application of the model), and column 1210 is the calculated RGS values. It is clear from FIG. 12 that the predicted RGS values have good agreement with the NMRT2 distribution (column 1212) which can indirectly reflect sandstone grain size change in the entire logging interval. A petrography study confirmed the grain size variation as well, as shown in FIG. 13, which is a composite plot showing log GR (column 1302), RHOB log (column 1304), predicted lithology (column 1306), predicted lithology in percentages (column 1308, and calculated RGS values (column 1310), with sample thin section petrographic images (column 1310) at depths A and B.

Figure 14:
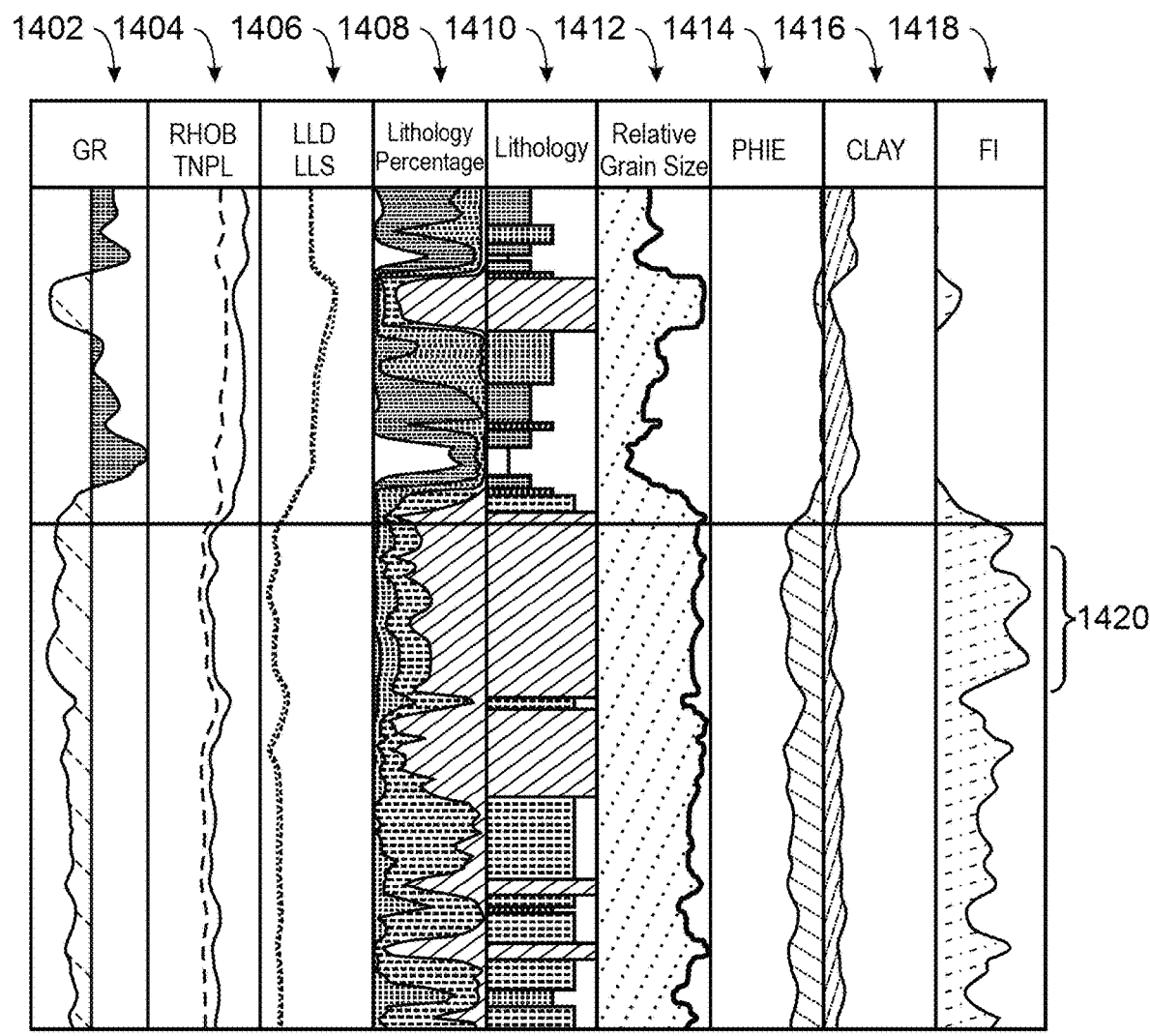
FIG. 14 is a composite plot showing predicted percentage for each lithology, dominant lithology, estimated relative grain size and computed flow index.

At step 618, FI values are calculated (using, for example, equation (2)) for those intervals of interest. Using these FI values, at step 620, target intervals for potential hydrocarbon production can be identified. For example, FIG. 14 is a composite plot showing GR (column 1402), RHOB log (column 1404), predicted lithology in percentages (column 1408), predicted lithology (column 1410), calculated RGS values (column 1412). By inputting the resulting RGS values (column 1412), PHIE (column 1414) and clay content (column 1416) into equation (2) the flow index at each depth (column 1418) is calculated. Interval 1410 of FIG. 14 is an interval with relatively high FI values, and so may exhibit the desired productivity for production.

Figure 18:
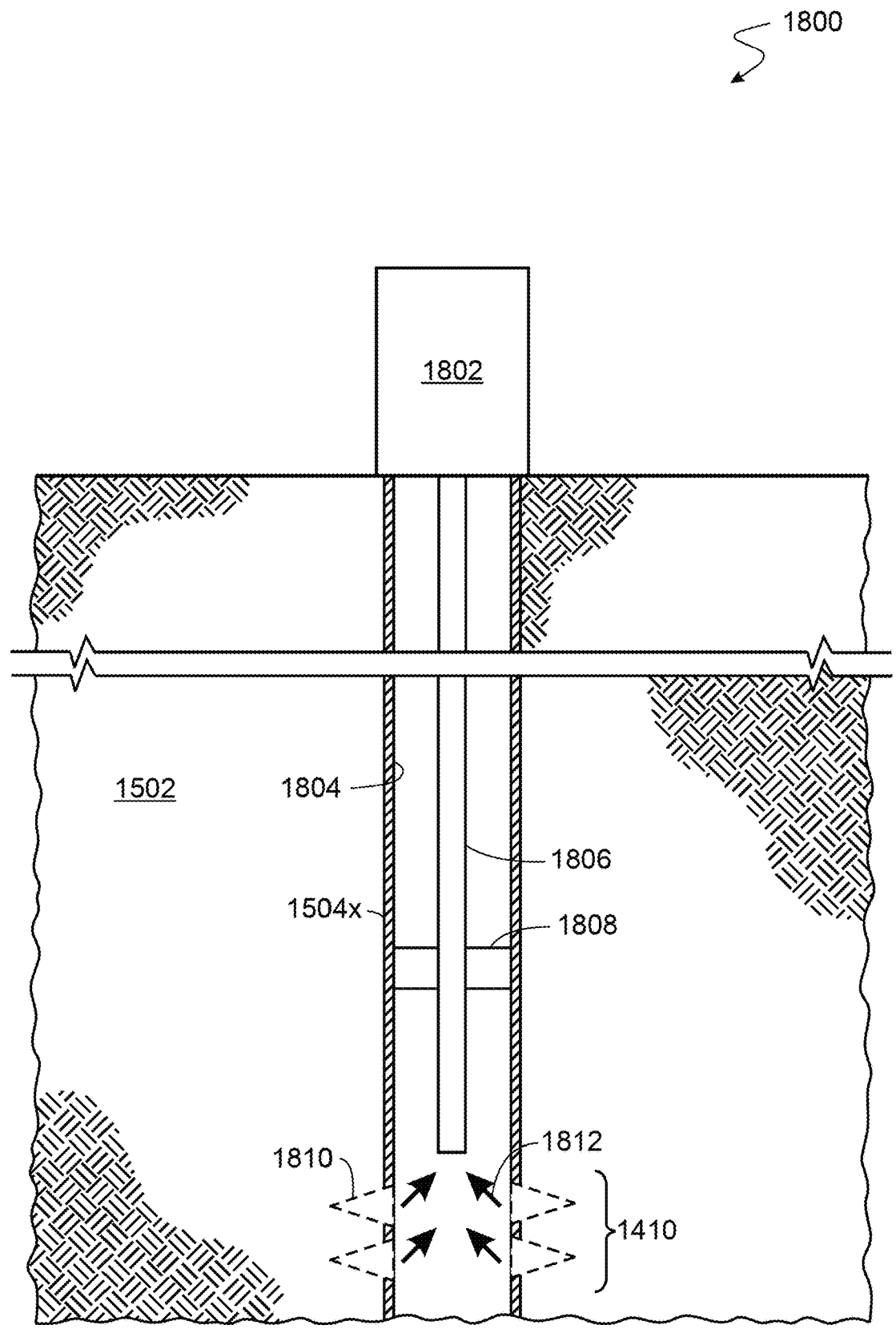
FIG. 18 is a schematic illustration of well production system in accordance with embodiments of the present disclosure.

Proceeding to step 622, hydrocarbons can be produced from the target zones, using, for example, production system 1800 of FIG. 18. As shown in FIG. 18, after casing and other completion of the production system, interval 140 can be perforated, allowing hydrocarbons 1812 to flow into the production tubing and thence to the surface.

Figure 19:
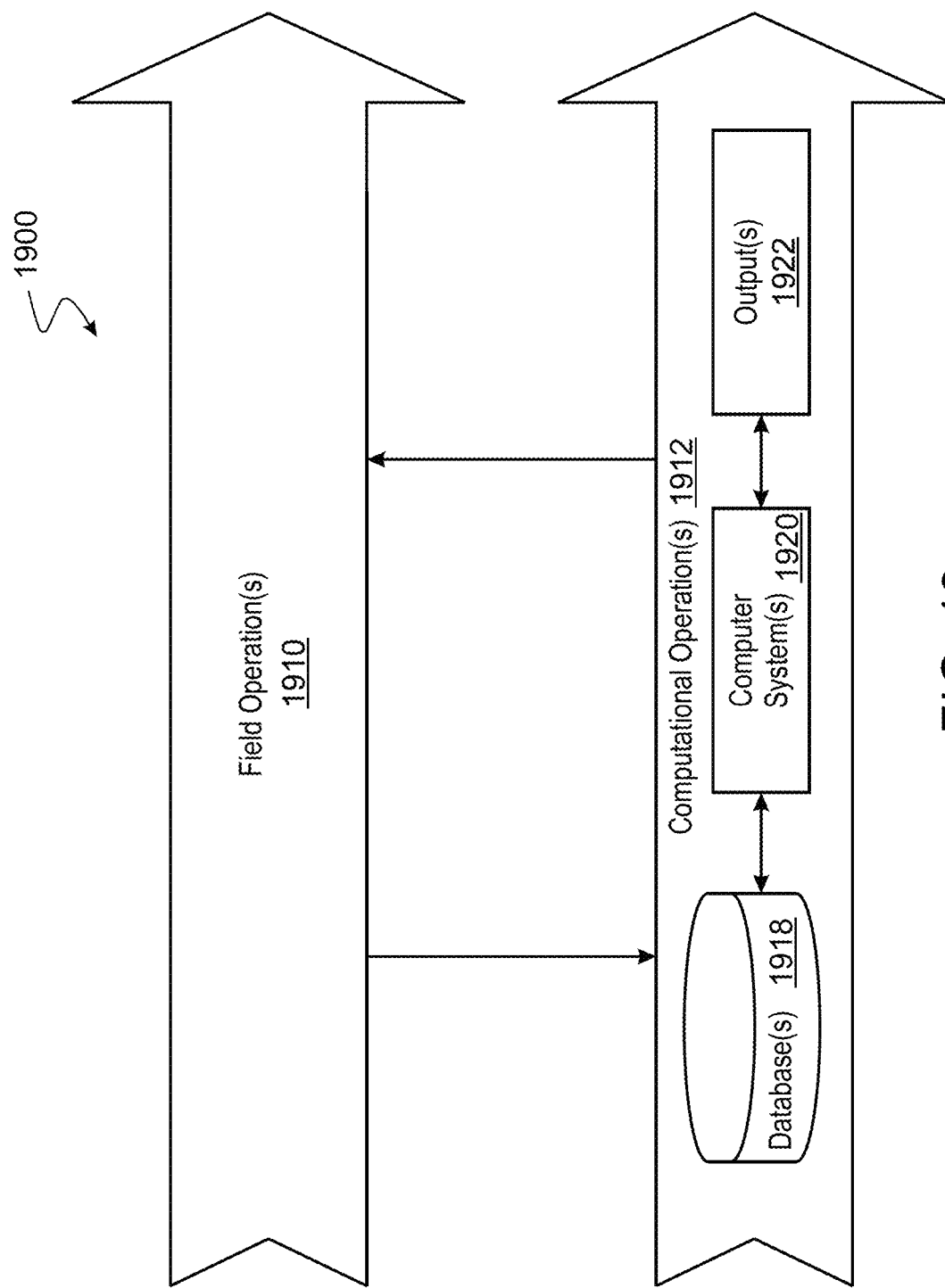
FIG. 19 is a schematic illustration of well operations and computing systems in accordance with embodiments of the present disclosure.

In some embodiments, the training and execution of the machine learning module, the calculation of the RGS values and FI values, and the identification of potential target zones can be by (in whole or in part) a computer system such as computer system 1920 of FIG. 19 configured to implement the model and perform the calculations, with the petrophysical data gathering and retrieval and core observation activities comprising field operations 1910 of FIG. 19.

As described above, FIG. 15 is an overhead map view of a subterranean zone 1502 into which wells 1504a-1504f have been drilled. Such wells can be drilled using, for example, drilling system 1600 of FIG. 16. Drilling system 1600 includes a derrick 1610 on surface 302 that supports the weight of and permits selective positioning of a drill string 1612 through a blowout preventer 1614 at the wellhead. The drill string 1612 has a downhole end coupled to a drill bit 1618 operable to drill the wellbore 1504x in subterranean zone 202. To facilitate drilling and removal of drill cuttings 1622, a circulation pump 1624 circulates drilling fluid 1626 though the wellbore. An inlet of a circulation pump 1624 is coupled to a reservoir for the drilling fluid through a first pipe 1627. In the illustrated system, the reservoir is a mud pit 1628. In some systems, reservoir can be, for example, a tank or tanks. A pump discharge of the circulation pump 1624 is coupled to a top end of the drill string 1612 through a second pipe 1616. The blowout preventer 1614 is coupled to a shaker table 3162 through a third pipe 1634. The mud pit 1628 is coupled to the shaker table 1632 and receives the drilling fluid 1626 from the shaker table 1632. During drilling, the drilling fluid 326 is pumped from the mud pit 328 and flows through the first pipe 1627 into the pump suction of the circulation pump 1624. The circulation pump 1624 then pumps the drilling fluid 1626 from the pump discharge to the top end of the drill string 1612 through the second pipe 1616.

Figure 17:
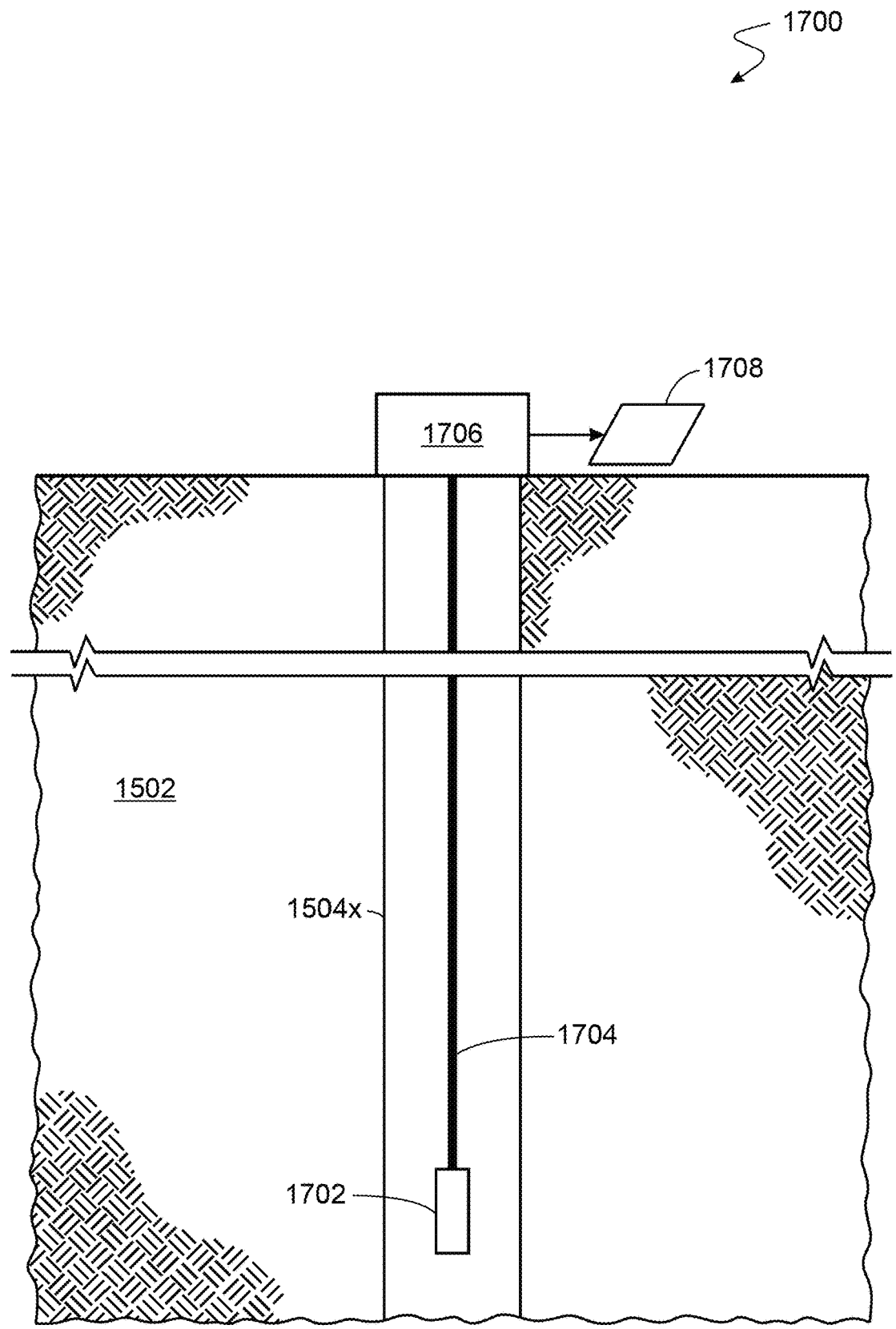
FIG. 17 is a schematic illustration of a well logging system in accordance with embodiments of the present disclosure.

As described above, logging of the wellbore training intervals and un-cored intervals of subterranean zone 1502 can be by logging system 1700 of FIG. 17. In the illustrated embodiment, logging system 1700 includes a logging tool 1702 is inserted in the wellbore 1504x and conveyed downhole via conveyance 1704. Logging tool 1702 may comprise electromagnetic sensors, nuclear sensors, acoustic sensors, gamma ray sensors, nuclear magnetic resonance (NMR) sensors, coring apparatus, and/or other suitable sensors or apparatus. Conveyance 1704 can be, for example, a wireline and may include a conductor and may enable data transmission between logging tool 402 and a wireline monitoring and control system 1606. Tool 1702 may be raised and lowered within the wellbore to various depths using devices known in the art, such as a reel and drum apparatus in a service truck having the various components of a wireline system. The monitoring and control system 1706 may control operation of tool 1702 and may receive data from tool 1702 to produce wireline logs 1708. Wireline logs 1708 may include gamma ray (GR), neutron porosity (NPHI), sonic (DT), deep resistivity (RTD), shallow resistivity (RTS), density (RHOB) logs, thermal neutron porosity (TNPL), and other suitable logs.

As described above, production from a target interval (such as target interval 1410 of FIG. 14) of well 1504x in subterranean zone 1502 can be by production system 1800 of FIG. 1800. Referring to FIG. 1800, well 1504x has been lined with casing 1804 which has been cemented into place. Production tubing 1806 is disposed within the cased wellbore with the downhole end of production tubing 1806 isolated by packers 1808. At target interval 1410 (shown also in FIG. 14), the casing has been perforated with perforations 1810, allowing hydrocarbons to flow from interval 1410 into production tubing 1806 to surface production facility 1802. Surface production facility 1802 can include valves, pipes, and other apparatus and systems to receive produced fluids and facilitate flow to pipelines, tanks, other surface flow systems.

As described above, the training and execution of the machine learning module, the calculation of the RGS values and FI values, and the identification of potential target zones can be by (in whole or in part) a computer system such as computer system 1920 of FIG. 19. Referring to FIG. 19 field and computer operations system 1900 can include one or more field operation systems 1910 and one or more computational operations systems 1912, which exchange information and control exploration for the production of hydrocarbons. In some implementations, outputs of techniques of the present disclosure can be performed before, during, or in combination with the hydrocarbon production operation system 1900 specifically, for example, either by field operations system 1910 or computational operations 1912, or both.

Examples of field operations by field operation system 1910 include forming/drilling a wellbore, hydraulic fracturing, producing through the wellbore, injecting fluids (such as water) through the wellbore, cuttings retrieval, or cuttings analysis, to name a few. In some implementations, methods of the present disclosure can trigger or control the field operations. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations and responsively triggering the field operations including, for example, generating plans and signals that provide feedback to and control physical components of the field operations. Alternatively or in addition, the field operations can trigger the methods of the present disclosure. For example, implementing physical components (including, for example, hardware, such as sensors) deployed in the field operations can generate plans and signals that can be provided as input or feedback (or both) to the methods of the present disclosure.

Computational operations system 1912 can include one or more computer systems 1920 that include one or more processors and computer-readable media (e.g., non-transitory computer-readable media) operatively coupled to the one or more processors to execute computer operations to perform the methods of the present disclosure. The computational operations can be implemented using one or more databases 1918, which store data received from the field operations and/or generated internally within the computational operations (e.g., by implementing the methods of the present disclosure) or both. For example, the one or more computer systems 520 process inputs from the field operations to assess conditions in the physical world, the outputs of which are stored in the databases 1918. For example, seismic sensors of the field operations 510 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations where they are stored in the databases 1918 and analyzed by the one or more computer systems 1920.

In some implementations, one or more outputs 1922 generated by the one or more computer systems 1920 can be provided as feedback/input to the field operations (either as direct input or stored in the databases 1918). The field operations can use the feedback/input to control physical components used to perform the field operations in the real world.

For example, the computational operations can process the seismic data to generate three-dimensional (3D) maps of the subsurface formation. The computational operations can use these 3D maps to provide plans for locating and drilling exploratory wells. In some operations, the exploratory wells are drilled using logging-while-drilling (LWD) techniques which incorporate logging tools into the drill string. LWD techniques can enable the computational operations to process new information about the formation and control the drilling to adjust to the observed conditions in real-time.

The one or more computer systems 1920 can update the 3D maps of the subsurface formation as information from one exploration well is received and the computational operations 1912 can adjust the location of the next exploration well based on the updated 3D maps. Similarly, the data received from production operations can be used by the computational operations to control components of the production operations. For example, production well and pipeline data can be analyzed to predict slugging in pipelines leading to a refinery and the computational operations can control machine operated valves upstream of the refinery to reduce the likelihood of plant disruptions that run the risk of taking the plant offline.

In some implementations of the computational operations, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

The term "uphole" as used herein means in the direction along a wellbore from its distal end towards the surface and through the wellhead, and "downhole" as used herein means the direction through the wellhead and along the wellbore from the surface towards the wellbore's distal end. A downhole location means a location along a wellbore downhole of the surface.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate. Accordingly, the previously described example implementations do not define or constrain the present disclosure. Other changes, substitutions, and alterations are also possible without departing from the spirit and scope of the present disclosure.

Examples

In a first aspect, a method for hydrocarbon production from a subterranean zone comprising sedimentary rock materials includes retrieving, based on petrophysical well log data from one or more un-cored depth intervals of at least one of one or more wells drilled into the subterranean zone, an effective porosity of sedimentary rock materials at the one or more un-cored depth intervals, and retrieving, based on the petrophysical well log data from the one or more un-cored depth intervals, a total clay content of the sedimentary rock materials at the one or more un-cored depth intervals. A relative grain size value for the one or more un-cored depth intervals is generated by executing a machine learning model to process the petrophysical well log data. The relative grain size value represents relative proportions of grain sizes of sedimentary rock materials at the un-cored depth intervals. The machine learning model is trained based on an observed grain size of sedimentary rock materials at one or more cored intervals of one or more wells drilled in the subterranean zone and petrophysical well log data obtained from the one or more cored intervals. Based on the relative grain size value generated from the machine learning model, flow index values for the one or more un-cored depth intervals of the production well are determined. The flow index is a function of the effective porosity, the total clay content, and the relative grain size value. One or more target depth intervals for production of hydrocarbons are determined based at least in part on the flow index values for the un-cored depth intervals. Hydrocarbons are produced from one or more target depth intervals In a second aspect in accordance with the first aspect, wherein the flow index value is determined in the following equation:

$$FI = \frac{PHIE}{(a + \text{total clay})} * \frac{RGS}{5}$$

where FI is the flow index value, PHIE is the effective porosity, total clay is the total clay content, a is a constant value, and RGS is the relative grain size value.

In a third aspect in accordance with the first or second aspects, the relative grain size value is based on grain size percentages of each of a pre-defined set of grain percentages. The pre-defined sets of grain percentages comprise the percentage of course-grained sands, the percentage of medium-grained sands, the percentage of fine-grained sands; the percentage of siltstone, and the percentage of shale. The determining the relative grain size value of the sedimentary formation at each depth interval of the plurality of depth intervals of the production well comprises determining the relative grain size value for the interval in the following equation:

RGS=(CSA*5)+(MSA*4)+(FSA*3)+(SS*2)+(SH*1)

where RGS is the relative grain size value, CSA is the percentage of course-grained sands, MSA is the percentage of medium-grained sands, FSA is the percentage of fine-grained sands, SS is the percentage of siltstone, and SH is the percentage of shale.

In a fourth aspect in accordance with any of the first through third aspects, the method further includes drilling the one or more wells.

In a fifth aspect in accordance with any of the first through fourth aspects, the method further includes logging the one or more wells with petrophysical tools to obtain the petrophysical well log data from the one or more un-cored depth intervals.

In a sixth aspect in accordance with any of the first through fifth aspects, the one or more un-cored depth intervals are depth intervals in a different well than a well from which the one or more un-cored depth intervals are obtained.

In a seventh aspect, a method for hydrocarbon production from a subterranean zone comprising sedimentary rock material includes training a machine learning model based on correlation of an observed grain size of sedimentary rock materials at one or more cored intervals of one or more wells drilled into the subterranean zone and petrophysical well log data obtained from the or more cored intervals. The method further includes generating, by a computer executing a machine learning model, a relative grain size value for one or more un-cored depth intervals. The relative grain size value represents relative proportions of grain sizes of sedimentary rock materials at the un-cored depth intervals. Flow index values for the one or more un-cored depth intervals are determined by the computer. The flow index is a function of (i) an effective porosity and a total clay content of the one or more un-cored depth intervals determined based on petrophysical well log data and (ii) the relative grain size values. One or more target depth intervals for production of hydrocarbons are determined based at least in part on the flow index values for the un-cored depth intervals. Hydrocarbons are produced from one or more target depth intervals.

In an eighth aspect in accordance with the seventh aspect, the flow index value is determined in the following equation:

$$FI = \frac{PHIE}{(a + \text{total clay})} * \frac{RGS}{5}$$

where FI is the flow index value, PHIE is the effective porosity, total clay is the total clay content, a is a constant value, and RGS is the relative grain size value.

In a ninth aspect in accordance with seventh or eighth aspects, the relative grain size value is based on grain size percentages of each of a pre-defined set of grain percentages. The pre-defined sets of grain percentages comprise the percentage of course-grained sands, the percentage of medium-grained sands, the percentage of fine-grained sands; the percentage of siltstone, and the percentage of shale. The determining the relative grain size value of the sedimentary formation at each depth interval of the plurality of depth intervals of the production well comprises determining the relative grain size value for the interval in the following equation:

RGS=(CSA*5)+(MSA*4)+(FSA*3)+(SS*2)+(SH*1)

where RGS is the relative grain size value, CSA is the percentage of course-grained sands, MSA is the percentage of medium-grained sands, FSA is the percentage of fine-grained sands, SS is the percentage of siltstone, and SH is the percentage of shale.

In a tenth aspect in accordance with any of the seventh through ninth aspects, the method further includes drilling the one or more wells.

In an eleventh aspect in accordance with any of the seventh through tenth aspects, the method further includes logging the one or more wells with petrophysical tools to obtain the petrophysical well log data from the one or more un-cored depth intervals.

In twelfth aspect in accordance with any of the seventh through eleventh aspects, the one or more un-cored depth intervals are depth intervals in a different well than a well from which the one or more un-cored depth intervals are obtained.

What is claimed is:

1. A method for hydrocarbon production from a subterranean zone comprising sedimentary rock materials, the method comprising:
retrieving, based on petrophysical well log data from one or more un-cored depth intervals of at least one of one or more wells drilled into the subterranean zone, an effective porosity of sedimentary rock materials at the one or more un-cored depth intervals;
retrieving, based on the petrophysical well log data from the one or more un-cored depth intervals, a total clay content of the sedimentary rock materials at the one or more un-cored depth intervals;
generating, by executing a machine learning model to process the petrophysical well log data, a relative grain size value for the one or more un-cored depth intervals, the relative grain size value representing relative proportions of grain sizes of sedimentary rock materials at the un-cored depth intervals, the machine learning model being trained based on:
an observed grain size of sedimentary rock materials at one or more cored intervals of one or more wells drilled in the subterranean zone; and
petrophysical well log data obtained from the one or more cored intervals;
determining, based on the relative grain size value generated from the machine learning model, flow index values for the one or more un-cored depth intervals of the production well, wherein the flow index is a function of the effective porosity, the total clay content, and the relative grain size value;
determining one or more target depth intervals for production of hydrocarbons based at least in part on the flow index values for the un-cored depth intervals; and
producing hydrocarbons from one or more target depth intervals.

2. The method of claim 1, wherein the flow index value is determined in the following equation:

$$FI = \frac{PHIE}{(a + \text{total clay})} * \frac{RGS}{5}$$

where FI is the flow index value, PHIE is the effective porosity, total clay is the total clay content, a is a constant value, and RGS is the relative grain size value.

3. The method of claim 1, wherein:
the relative grain size value is based on grain size percentages of each of a pre-defined set of grain percentages, wherein the pre-defined sets of grain percentages comprise:
the determining the relative grain size value of the sedimentary formation at each depth interval of the plurality of depth intervals of the production well comprises determining the relative grain size value for the interval in the following equation:

RGS=(CSA*5)+(MSA*4)+(FSA*3)+(SS*2)+(SH*1)

where RGS is the relative grain size value, CSA is the percentage of course-grained sands, MSA is the percentage of medium-grained sands, FSA is the percentage of fine-grained sands, SS is the percentage of siltstone, and SH is the percentage of shale.

4. The method of claim 1, further comprising drilling the one or more wells.

5. The method of claim 1, further comprising logging the one or more wells with petrophysical tools to obtain the petrophysical well log data from the one or more un-cored depth intervals.

6. The method of claim 1, wherein the one or more un-cored depth intervals are depth intervals in a different well than a well from which the one or more un-cored depth intervals are obtained.

7. A method for hydrocarbon production from a subterranean zone comprising sedimentary rock materials, the method comprising:
training a machine learning model based on correlation of:
an observed grain size of sedimentary rock materials at one or more cored intervals of one or more wells drilled into the subterranean zone; and
petrophysical well log data obtained from the or more cored intervals;
generating, by a computer executing a machine learning model, a relative grain size value for one or more un-cored depth intervals, the relative grain size value representing relative proportions of grain sizes of sedimentary rock materials at the un-cored depth intervals;
determining, by the computer, flow index values for the one or more un-cored depth intervals, wherein the flow index is a function of (i) an effective porosity and a total clay content of the one or more un-cored depth intervals determined based on petrophysical well log data and (ii) the relative grain size values;
determining one or more target depth intervals for production of hydrocarbons based at least in part on the flow index values for the un-cored depth intervals; and
producing hydrocarbons from one or more target depth intervals.

8. The method of claim 7, wherein the flow index value is determined in the following equation:

$$FI = \frac{PHIE}{(a + \text{total clay})} * \frac{RGS}{5}$$

where FI is the flow index value, PHIE is the effective porosity, total clay is the total clay content, a is a constant value, and RGS is the relative grain size value.

9. The method of claim 7, wherein:
the relative grain size value is based on grain size percentages of each of a pre-defined set of grain percentages comprising:
the determining the relative grain size value of the sedimentary formation at each depth interval of the plurality of depth intervals of the production well comprises determining the relative grain size value for the interval in the following equation:

RGS=(CSA*5)+(MSA*4)+(FSA*3)+(SS*2)+(SH*1)

where RGS is the relative grain size value, CSA is the percentage of course-grained sands, MSA is the percentage of medium-grained sands, FSA is the percentage of fine-grained sands, SS is the percentage of siltstone, and SH is the percentage of shale.

10. The method of claim 7, further comprising drilling the one or more wells.

11. The method of claim 7, further to comprising logging the one or more wells with petrophysical tools to obtain the petrophysical well log data from the one or more un-cored depth intervals.

12. The method of claim 7, wherein the one or more un-cored depth intervals are depth intervals in a different well than a well from which the one or more un-cored depth intervals are obtained.

* * * * *